US012753602B2

(12) United States Patent
Morimoto et al.

(10) Patent No.: US 12,753,602 B2

(45) Date of Patent: Oct. 6, 2026

(54) STEEL PLATE COMPOSITE WALL PANEL STRUCTURES, SUCH AS FOR USE IN NUCLEAR REACTOR BUILDINGS, AND ASSOCIATED SYSTEMS AND METHODS

(71) Applicant: NuScale Power, LLC, Corvallis, OR (US)

(72) Inventors: Yasutomi Morimoto, Kanagawa (JP); Eiji Kawada, Kanagawa (JP)

(73) Assignee: NuScale Power, LLC, Corvallis, OR (US)

( * ) Notice: Subject to any disclaimer, the term of this patent is extended or adjusted under 35 U.S.C. 154(b) by 383 days.

(21) Appl. No.: 18/451,653

(22) Filed: Aug. 17, 2023

(65) Prior Publication Data

US 2024/0209626 A1 Jun. 27, 2024

Related U.S. Application Data

(60) Provisional application No. 63/373,046, filed on Aug. 19, 2022.

(51) Int. Cl.
*E04B 2/86* (2006.01)
*G21C 13/00* (2006.01)

(52) U.S. Cl.
CPC ............ *E04B 2/8635* (2013.01); *G21C 13/00* (2013.01)

(58) Field of Classification Search
CPC ...... G21C 13/00; G21C 13/093; G21C 9/001; E04B 2/8635; E04B 5/29; E04B 5/18; G21F 1/08; E04C 3/09
See application file for complete search history.

(56) References Cited

U.S. PATENT DOCUMENTS 3,321,884 A * 5/1967 Klaue ........................ E04C 2/34 52/378
3,481,093 A * 12/1969 Davidson .............. E04B 2/8635 52/779

(Continued)

FOREIGN PATENT DOCUMENTS

CN 102359204 A 2/2012
WO WO10013858 W 2/2010

OTHER PUBLICATIONS

PCT Search Report and Written Opinion mailed Feb. 5, 2024, for PCT Application No. PCT/US23/72410, 11 pages.

*Primary Examiner* — Gisele D Ford
(74) *Attorney, Agent, or Firm* — Lee & Hayes, P.C.

(57) ABSTRACT

Structures for forming a module, such as a module for use in a nuclear reactor building, and associated systems and methods are described herein. A representative structure can include a first plate, a second plate spaced apart from and positioned parallel to the first plate, and a support assembly positioned between the first and second plates. The support assembly can include a column, a first beam extending from the column parallel to the first and second plates, and a second beam extending from the column parallel to the first and second plates. The panel structure can further include a plurality of spaced apart joint plates extending between and connecting the first and second plates. The joint plates can support the first beam and the second beam. The panel structure can further include a fill material between the first and second plates and surrounding the support assembly and the joint plates.

15 Claims, 13 Drawing Sheets

(56) References Cited

U.S. PATENT DOCUMENTS

| | | | | | |
|---|---|---|---|---|---|
| 3,676,967 | A * | 7/1972 | Frati | E04B 2/8635 | 52/444 |
| 3,751,867 | A * | 8/1973 | Layne | E04B 2/8647 | 52/592.6 |
| 3,881,288 | A * | 5/1975 | Fay | F16L 59/12 | 52/249 |
| 4,279,701 | A * | 7/1981 | Ebata | G21C 11/081 | 976/DIG. 161 |
| 4,458,458 | A * | 7/1984 | Orii | B65D 90/043 | 376/250 |
| 5,638,652 | A * | 6/1997 | Shinoda | G21C 13/093 | 52/432 |
| 5,673,528 | A * | 10/1997 | Danisch | G21C 13/00 | 52/249 |
| 5,741,571 | A * | 4/1998 | Bowerman | B23K 11/008 | 428/614 |
| 7,051,488 | B2 * | 5/2006 | Nelson | E04B 1/161 | 52/843 |
| 2003/0029111 | A1 * | 2/2003 | Yabuuchi | E04C 5/0645 | 52/425 |
| 2007/0095014 | A1 * | 5/2007 | Nilsen | E04C 5/168 | 52/782.1 |
| 2008/0083181 | A1 | 4/2008 | Ospina | | |
| 2015/0275531 | A1 * | 10/2015 | Alcala Ordaz | E04B 2/8658 | 249/189 |
| 2019/0136521 | A1 | 5/2019 | Karakas | | |
| 2020/0123768 | A1 * | 4/2020 | Niepceron | E04B 2/8635 | |
| 2021/0095472 | A1 * | 4/2021 | Draper | E04C 5/168 | |

* cited by examiner

STEEL PLATE COMPOSITE WALL PANEL STRUCTURES, SUCH AS FOR USE IN NUCLEAR REACTOR BUILDINGS, AND ASSOCIATED SYSTEMS AND METHODS

CROSS-REFERENCE TO RELATED APPLICATION

This application claims the benefit of U.S. Provisional Patent Application No. 63/373,046, filed Aug. 19, 2022, and titled "STEEL PLATE COMPOSITE WALL PANEL STRUCTURES, SUCH AS FOR USE IN NUCLEAR REACTOR BUILDINGS, AND ASSOCIATED SYSTEMS AND METHODS," which is incorporated herein by reference in its entirety.

TECHNICAL FIELD

Embodiments of the disclosure generally relate to structure bodies such as for use in nuclear reactor buildings, and in particular, to structure bodies formed from steel-panel composite wall panel structures.

BACKGROUND

Buildings such as plants used in nuclear facilities, military facilities, and the like may include structure bodies such as building housings for accommodating equipment such as safety-related equipment. Such a structure body can be built by assembling a plurality of modules that have already been manufactured according to the functions and the like of the equipment to be accommodated. Structures used for manufacturing these modules are required to have high structural strength to ensure the integrity of the structure body to be built. These structures may include steel-plate composite (SC) wall panel structures. An SC wall panel structure can generally include two steel plates between which concrete is disposed. For example, there is a technique for constructing a structure body such as a building housing for a nuclear plant using such an SC wall panel structure. In addition, according to the technique, some unit modules each formed by SC wall panel structures are manufactured at an off-site location away from a construction site or at an on-site location where the structure body is to be constructed. If manufactured off-site, the unit modules are transported to the on-site location via sea or land, and then these transported unit modules are assembled into the structure body at the on-site location.

FIGS. 1A and 1B are perspective views of such a conventional SC wall panel structure 10. As shown in FIG. 1A, the SC wall panel structure 10 is configured to have a first steel plate 1 and a second steel plate 2 opposing each other and joined to each other by a plurality of tie bars 3. As shown in FIG. 1B, concrete 5 is filled between the first steel plate 1 and the second steel plate 2. Each of the first steel plate 1 and the second steel plate 2 has an inner surface on which multiple studs 4 are provided to extend generally in the normal direction from the respective steel plates to enhance connectivity between the concrete 5 and the first and second steel walls 1 and 2. The studs 4 can be headed studs. Such a conventional SC wall panel structure can be found in ANSI/AISC N690-18, An American National Standard, Specification for Safety-Related Steel Structures for Nuclear Facilities, Jun. 28, 2018, for example.

The manufactured SC wall panel structure 10, however, may not be practically transported (e.g., by ship or rail) due to the weight of the concrete 5 filled between the steel plates

1 and 2. On the other hand, since filing the structure with concrete 5 adds structure, the SC wall panel structure 10 may not have sufficient strength to bear inertial and/or other forces that may be applied during transportation, if the SC wall panel structure 10 is transported without the concrete 5 being installed.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1A:
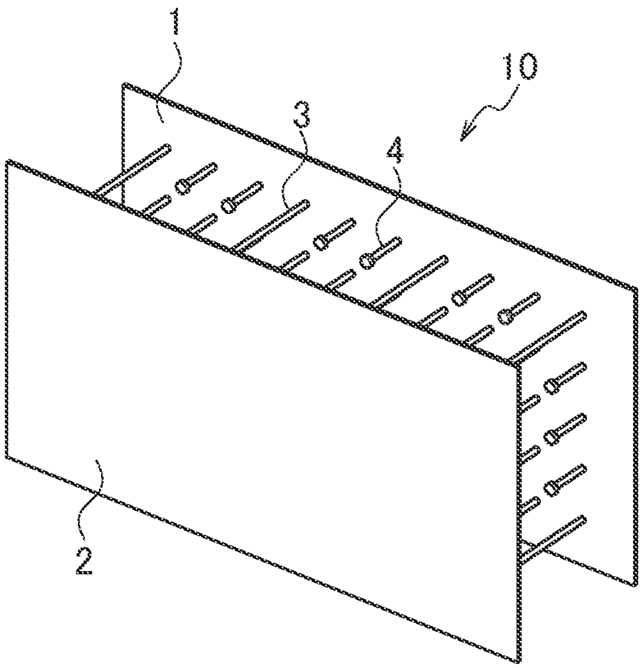
FIG. 1A Prior Art
FIG. 1A is a perspective view of a conventional steel-plate composite (SC) wall panel structure.
Figure 1B:
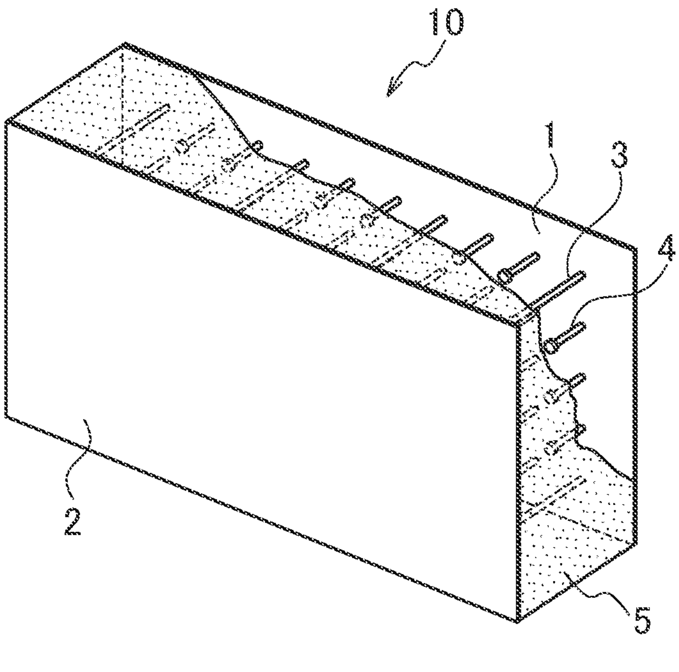
FIG. 1B Prior Art
FIG. 1B is a perspective view of the conventional SC wall panel structure of FIG. 1A being filled with concrete.

Aspects of the present technology are directed generally toward structures for forming a module, such as a module for use in a nuclear reactor building. In several of the embodiments described below, a panel structure can include a first plate, a second plate spaced apart from and extending parallel to the first plate, and a support assembly positioned between the first plate and the second plate. The support assembly can include a column, a first beam extending from the column in a first direction parallel to the first plate and the second plate, and a second beam extending from the column in a second direction parallel to the first plate and the second plate. The second direction can be opposite to the first direction, and the first and second directions can be perpendicular to a longitudinal axis of the column. The panel structure can further include a plurality of joint plates extending between the first plate and the second plate and connecting the first plate to the second plate. The joint plates can be spaced apart from and extend parallel to one another, and can be coupled to the first beam and the second beam to support the first beam and the second beam. The panel structure can further include a fill material, such as concrete, between the first plate and the second plate and surrounding the support assembly and the joint plates.

In some embodiments, the panel structure can be assembled at a first location without the fill material. The panel structure can then be shipped to a second location remote from the first location, where the fill material can be filled between the first plate and the second plate. In some aspects of the present technology, the support assembly and the joint plates provide strength and rigidity to the panel structure during shipping that can reduce or even prevent damage to the panel structure when the fill material has not yet been disposed between the first plate and the second plate. Accordingly, the panel structure can be reliably shipped to the second location without the fill material—substantially reducing the weight of the panel structure and cost/difficulty of transportation—where it can be subsequently filled with the fill material at the second location to provide a permanent structure, such as a portion of a structure enclosing a nuclear reactor.

In some embodiments, a structure configured in accordance with the present technology may include two steel plates arranged respectively on one side and the other side opposing each other in parallel, a plurality of joint plates extending in parallel with and separately from each other between the two steel plates to connect the two steel plates to each other, a plane along which the plurality of joint plates extend being perpendicular to a plane along which the two steel plates extend, a column disposed between adjacent joint plates of the plurality of the joint plates between the two steel plates, and two beams extending between the two steel plates in opposing directions from the column, the opposing directions being perpendicular to a longitudinal direction of the column. Each of the plurality of joint plates may be configured to support the two beams.

In some embodiments, each of the plurality of joint plates may be configured to position the two beams between the two steel plates.

In some embodiments, the column and the two beams may form a column-beam assembly.

In some embodiments, the column may be formed as a rectangular steel tube.

In some embodiments, each of the two beams may be formed as an I-section beam or H-section beam.

In some embodiments, at least one of the plurality of joint plates may be connected to the I-section beam or H-section beam by double angles.

In some embodiments, at least one of the plurality of joint plates may include a cutout to abut and receive the I-section beam or H-section beam.

In some embodiments, the structure may include a first structure and a second structure adjacent to each other in a longitudinal direction of the column, and a steel plate on the one side of the first structure and a steel plate on the one side of the second structure may be connected to each other by welding.

In some embodiments, the first structure and the second structure may share the two beams.

In some embodiments, the column of the second structure may be aligned with the column of the first structure by the weight of the second structure that is stacked on the first structure prior to the welding.

In some embodiments, a plurality of functional portions provided at a top end of the column of the first structure may engage with a bottom end of the column of the second structure.

In some embodiments, each of the plurality of functional portions may include a part angled with respect to the longitudinal direction of the column.

In some embodiments, the column of each of the first and second structures may be configured as a rectangular steel tube, and the plurality of functional portions of the first structure may be provided respectively at four corners of the rectangular steel tube of the first structure.

In some embodiments, the two beams and the column are connected to each other to convey moment load therebetween in the column-beam assembly.

In some embodiments, at least one of a side surface, a top surface, and a bottom surface of a module may be defined by a structure formed off site.

According to another aspect of the present disclosure, a module is provided. At least one of a side surface, a top surface, and a bottom surface of the module may be defined by one or more structures, and each of the one or more structures may include two steel plates arranged respectively on one side and the other side opposing each other in parallel, a plurality of joint plates extending in parallel with and separately from each other between the two steel plates to join the two steel plates to each other, a plane along which the plurality of joint plates extend being perpendicular to a plane along which the two steel plates extend, a column disposed between adjacent joint plates of the plurality of the joint plates between the two steel plates, and two beams extending from the column to oppose each other perpendicular to a longitudinal direction of the column between the two steel plates along a plane along which the two steel plates extend. Each of the plurality of joint plates may be configured to bear the two beams.

In some embodiments, each of the plurality of joint plates may be configured to position the two beams between the two steel plates.

In some embodiments, the module may include one or more pieces of equipment.

In some embodiments, after the at least one of a side surface, a top surface, and a bottom surface of the module is formed by the one or more structures, concrete may be filled between the two steel plates.

In some embodiments, studs may protrude from the respective two steel plates to be integrated into the concrete.

According to another aspect of the present disclosure, a structure body is provided. The structure body may include a plurality of modules vertically or horizontally connected to each other, and at least one of a side surface, a top surface, or a bottom surface of each of the plurality of modules may be defined by one or more structures. Each of the one or more structures may include two steel plates arranged respectively on one side and the other side opposing each other in parallel, a plurality of joint plates extending in parallel with and separately from each other between the two steel plates to join the two steel plates to each other, a plane along which the plurality of joint plates extend being perpendicular to a plane along which the two steel plates extend, a column disposed between adjacent joint plates of the plurality of the joint plates between the two steel plates, and two beams extending from the column to oppose each other perpendicular to a longitudinal direction of the column between the two steel plates along a plane along which the two steel plates extend. Each of the plurality of joint plates may be configured to bear the two beams, and concrete may be disposed into a space defined between the two steel plates.

According to another aspect of the present disclosure, a method of manufacturing a structure is provided. The method may include: providing a lower structure member including a first lower steel plate and a second lower steel plate arranged respectively on one side and the other side opposing each other in parallel, and a plurality of lower joint plates extending in parallel with and separately from each other between the first lower steel plate and the second lower steel plate to connect the first lower steel plate to the second lower steel plate; providing a column between the first lower steel plate and the second lower steel plate and between a pair of lower joint plates adjacent to each other among the plurality of lower joint plates; providing a pair of beams extending in opposite directions from the column between the first lower steel plate and the second lower steel plate to be supported by the plurality of lower joint plates; connecting the pair of beams to the column; providing an upper structure member including a first upper steel plate and a second upper steel plate arranged respectively on the one side and the other side, and a plurality of upper joint plates extending in parallel with and separately from each other between the first upper steel plate and the second upper steel plate to connect the first upper steel plate to the second upper steel plate; providing the upper structure member over the lower structure member such that the plurality of upper joint plates are placed on the pair of beams while the column is disposed between a pair of upper joint plates adjacent with each other among the plurality of upper joint plates; and connecting the first upper steel plate and the second upper steel plate to the first lower steel plate and the second lower steel plate, respectively.

In some embodiments, cutouts opening upward and configured to receive the pair of beams may be provided on respective tops of the plurality of lower joint plates.

In some embodiments, cutouts opening downward and configured to receive the pair of beams may be provided on respective bottoms of the plurality of upper joint plates.

According to another aspect of the present disclosure, a method of manufacturing a module is provided. The method may include forming a structure, and defining at least one of a side surface, a top surface, and a bottom surface of the module by the structure. The structure may include two steel plates arranged respectively on one side and the other side opposing each other in parallel, a plurality of joint plates extending in parallel with and separately from each other between the two steel plates to join the two steel plates to each other, a plane along which the plurality of joint plates extend being perpendicular to a plane along which the two steel plates extend, a column disposed between adjacent joint plates of the plurality of the joint plates and between the two steel plates, and two beams extending from the column to oppose each other perpendicular to a longitudinal direction of the column between the two steel plates along a plane along which the two steel plates extend. Each of the plurality of joint plates may be configured to bear the two beams. The structure may include a first structure and a second structure adjacent to each other in a longitudinal direction of the column. The step of forming the structure may further include engaging the column of the first structure with the column of the second structure, and connecting first steel plates on the one side and the other side of the first structure respectively to second steel plates on the one side and the other side of the second structure to form the two steel plates. The method may further include filling concrete into a space defined between the two steel plates.

In some embodiments, the step of engaging may include engaging a first column of the first structure disposed vertically below with a second column of the second structure disposed vertically above.

According to another aspect of the present disclosure, a method of manufacturing a structure body is provided. The method may include forming a plurality of modules, and vertically or horizontally connecting the plurality of modules to each other. The step of forming the plurality of modules may include forming a structure, and defining at least one of a side surface, a top surface, and a bottom surface of each of the plurality of modules by the structure. The structure may include two steel plates arranged respectively on one side and the other side opposing each other in parallel, a plurality of joint plates extending in parallel with and separately from each other between the two steel plates to join the two steel plates to each other, a plane along which the plurality of joint plates extend being perpendicular to a plane along which the two steel plates extend, a column disposed between adjacent joint plates of the plurality of the joint plates and between the two steel plates, and two beams extending from the column to oppose each other perpendicular to a longitudinal direction of the column between the two steel plates along a plane along which the two steel plates extend. Each of the plurality of joint plates may be configured to bear the two beams. The structure may include a first structure and a second structure adjacent to each other in a longitudinal direction of the column. The step of forming the structure may further include engaging a first column of the first structure with a second column of the second structure to form a column, and connecting first steel plates on the one side and the other side of the first structure respectively to second steel plates on the one side and the other side of the second structure to form the two steel plates. The method may further include filling concrete into a space defined between the two steel plates.

Certain details are set forth in the following description and in FIGS. 1-11 to provide a thorough understanding of various embodiments of the present technology. In other instances, well-known structures, materials, operations, and/or systems often associated with nuclear reactors, nuclear reactor buildings, steel-plate composite (SC) wall panel structures, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

1. Select SC Wall Panel Structures

Figure 2:
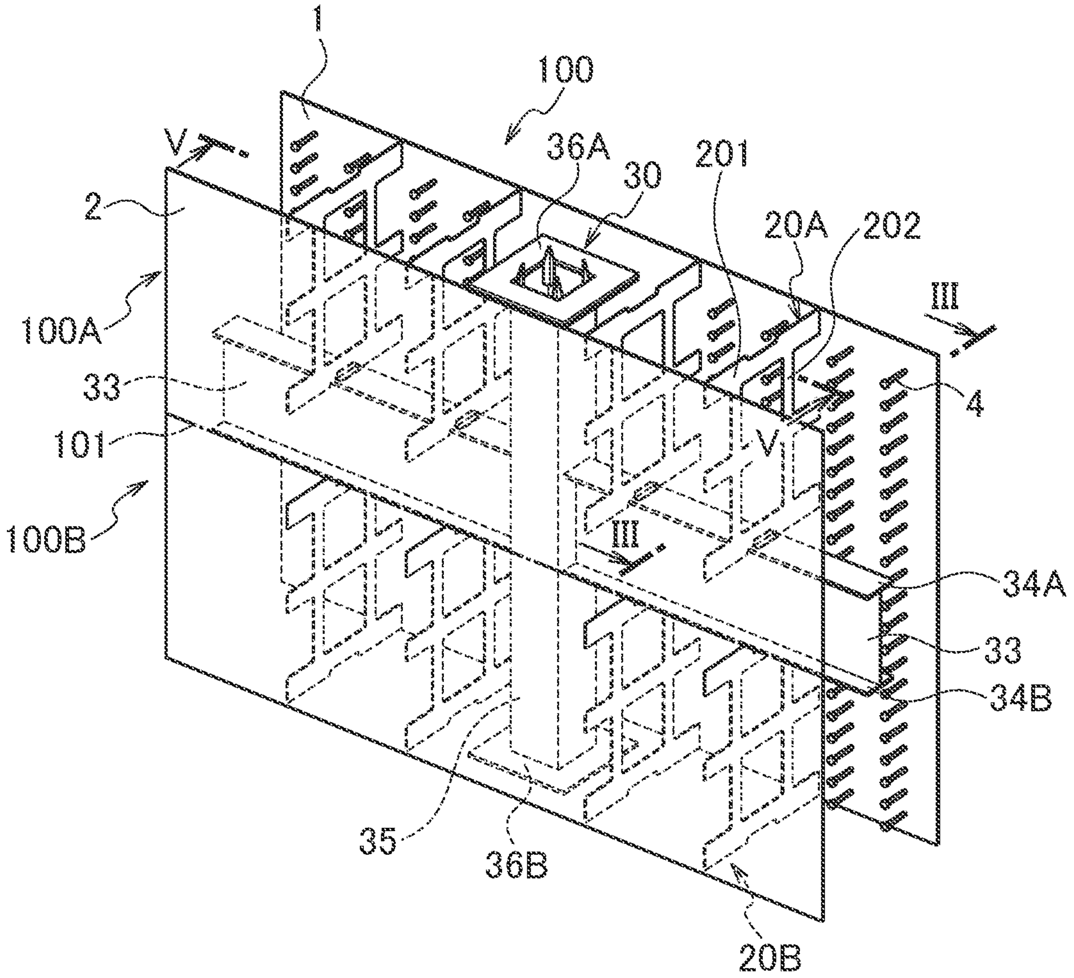
FIG. 2 is a perspective view of an SC wall panel structure in accordance with embodiments of the present technology.

FIGS. 2-6 are different views of a steel-plate composite (SC) wall panel structure 100 in accordance with embodiments of the present technology. FIG. 2, for example, is a perspective view of the SC wall panel structure 100 in accordance with embodiments of the present technology. In the illustrated embodiment, the SC wall panel structure 100 includes a first steel plate 1 and a second steel plate 2 that extend parallel or generally parallel to one another and that oppose one another. The second steel plate 2 is shown as partially transparent in FIG. 2 for clarity. The SC wall panel structures 100 further includes a plurality of joint plates 20 (including an individually identified first or upper joint plate 20A and a second or lower joint plate 20B) extending in parallel with and separately from one another to join the first steel plate 1 to the second steel plate 2. In the illustrated embodiment, the first and second joint plates 20A and 20B form a pair and are supported vertically adjacent to one another via a beam 33 described in detail below. The joint plates 20 can each be located in (e.g., extend along) a plane that is perpendicular or substantially perpendicular to planes in which the first and second steel plates 1, 2 are located. The joint plates 20 can be referred to as tie plates, rib plates, and/or the like. The joint plates 20 can be lattice shaped or ladder shaped as illustrated in FIG. 2, or can be uniform or have other patterns.

In some embodiments, the first steel plate 1 and the second steel plate 2 can each include an inner surface from which multiple studs 4 protrude generally in a normal (e.g., orthogonal, perpendicular) direction from the corresponding one of the first and second steel plates 1, 2. The studs 4 can be headed studs such that studs 4 can enhance the connectivity between the steel plates 1, 2 and concrete and/or another fill material (not shown) that can be later disposed (e.g., filled) between the first and second steel plates 1, 2. The first and second steel plates 1, 2 and the joint plates 20 can be formed from steel material, such as stainless steel, and/or other suitably rigid (e.g., metal) materials. Accordingly, while generally referred to herein as "steel plates," the first and second steel plates 1, 2 can be formed of materials other than steel. In the illustrated embodiment, the SC wall panel structure 100 can further include a connection line 101, which can be formed when an upper SC wall panel structure 100A is connected to a lower SC wall panel structure 100B by a connection means such as welding. The connection line 101 is depicted as dash-dot-dash line in FIG. 2.

The SC wall panel structure 100 can further include a column-beam assembly 30 (e.g., a support assembly) disposed between the first steel wall 1 and the second steel wall 2. The column-beam assembly 30 can include a column 35 vertically extending (e.g., along a longitudinal axis) between the first steel plate 1 and the second steel plate 2, and two beams 33 extending to oppose each other from the column 35 (e.g., in opposite directions from the column 35). The beams 33 can extend substantially perpendicular to a longitudinal axis of the column 35 (e.g., horizontally) between the first steel plate 1 and the second steel plate 2. In the column-beam assembly 30, the column 35 and the two beams 33 can form moment connections to convey a moment load acting on the beams 33 to the column 35, as described in, for example Chapter 10 of ANSI/AISC 358-16 ANSI/AISC 358s1-18, An American National Standard, Prequalified Connections for Special and Intermediate Steel Moment Frames for Seismic Applications, including Supplement No. 1, May 12, 2016, (includes 2018 supplement).

In the illustrated embodiment, each of the joint plates 20 is disposed between the first steel plate 1 and the second steel plate 2 to connect the first steel plate 1 to the second steel plate 2. The upper joint plates 20A can be spaced apart from one another and extend in a row between the first steel plate 1 and the second steel plate 2. Likewise, the lower joint plates 20B can be spaced apart from one another and extend in a row between the first steel plate 1 and the second steel plate 2. The two beams 33 extend between the rows of the upper and lower joint plates 20A, 20B and are supported by the joint plates 20 such that the column-beam assembly 30 can be positioned between the first steel plate 1 and the second steel plate 2. More specifically, the beams 33 are configured to be sandwiched between adjacent pairs of the joint plates 20 that are vertically offset from and adjacent to one another—such as between the pair comprising the first joint plate 20A and the second joint plate 20B. Each of the joint plates 20 can have a lattice-like pattern formed by a plurality of horizontally-extending portions 201 that may extend in a direction normal to the first and second steel plates 1, 2, and a plurality of vertically-extending extending portions 202 that may extend in a direction parallel to the first and second steel plates 1, 2 between two adjacent ones of the horizontally-extending portions 201. In the illustrated embodiment, each of the joint plates 20 includes two vertically-extending portions 202 that vertically extend in parallel with each other. Edges of the horizontally-extending portions 201 can be connected to respective ones of the first and second steel plates 1, 2. The connection between the joint plates 20 and the first and second steel plates 1, 2 can be performed by welding and/or another suitable technique. Although two vertically-extending portions 202 are depicted in the illustrated embodiment, more or fewer than two vertically-extending portions 202 can be included in each of the joint plates 20. Further, although three horizontally-extending portions 201 are depicted in the illustrated embodiment, each of joint plates 20 can include more or fewer than three horizontally-extending portions 201.

Figure 3:
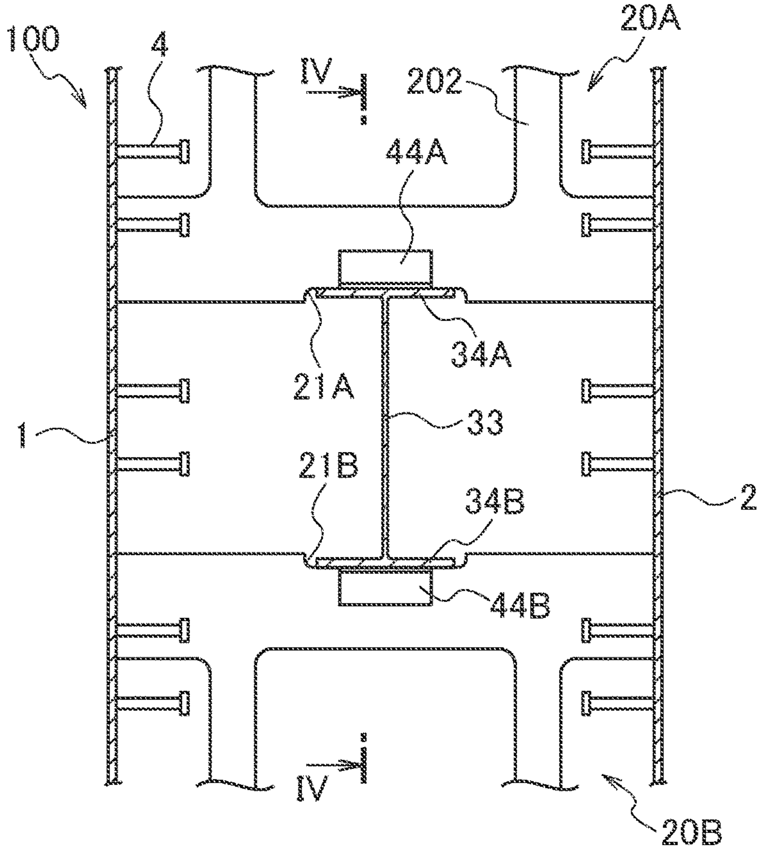
FIG. 3 is a cross-sectional view of the SC wall panel structure of FIG. 2 taken along the lines III-III in FIG. 2 in accordance with embodiments of the present technology.
Figure 4:
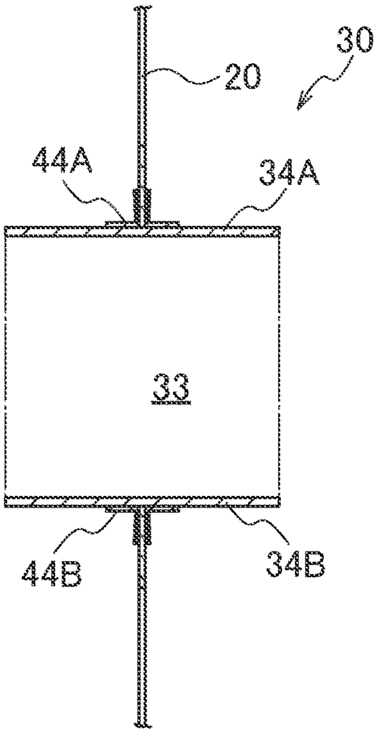
FIG. 4 is a cross-sectional view of the SC wall panel structure of FIG. 3 taken along the lines IV-IV in FIG. 3 accordance with embodiments of the present technology.

FIG. 3 is a cross-sectional view of the SC wall panel structure 100 of FIG. 2 taken along the lines III-III in FIG. 2 in accordance with embodiments of the present technology. FIG. 4 is a cross-sectional view of the SC wall panel structure 100 of FIG. 3 taken along the lines III-III in FIG. 3 in accordance with embodiments of the present technology. Referring to FIGS. 3 and 4 together, the relationship between a pair of the joint plates 120 (e.g., the pair of the joint plates 20 comprising the first joint plate 20A and the second joint plate 20B) extending vertically in the illustrated embodiments and one of the beams 33 sandwiched between the pair of the joint plates 120 is described in further detail.

The beam 33 can include an upper beam flange 34A and a lower beam flange 34B at respective edges of the beam 33 that vertically oppose each other. The beam 33 with the upper and lower beam flanges 34A and 34B may be commonly referred to as an I-section beam or H-section beam herein. Referring to FIG. 3, the upper beam flange 34A can be configured (e.g., shaped, sized) to be positioned in and received by a cutout 21A provided in a lower portion of the upper joint plate 20A that opens downward, and the lower beam flange 34B can be configured to be positioned in and received by a cutout 21B provided in an upper portion of the lower joint plate 20B that opens upward. Thus, the beam 33 can be positioned between the pair of the first and second joint plates 20A and 20B. Further, referring to FIGS. 3 and 4, the upper beam flange 34A positioned in the upper cutout 21A can be secured to the upper joint plate 20A by double angles 44A provided to sandwich the upper joint plate 20A, and the lower beam flange 34B positioned in the lower cutout 21B can be secured to the lower joint plate 20B by double angles 44B provided to sandwich the lower joint plate 20B. Such securement can be performed by welding and/or another suitable technique. The double angles 44A and the double angles 44B can be provided to oppose each other vertically or in a direction along which a web of the beam 33 extends. Alternatively, the upper joint plate 20A can be inserted between the double angles 44A and welded to the upper beam flange 34A, and the lower joint plate 20B can be inserted between the double angles 44B and welded to the lower beam flange 34B.

The double angles 44A that can be provided opposing each other via the joint plate 20A (and welded to the beam flange 34A and the joint plate 20A) can each have a substantially L-shaped cross section taken along a direction parallel with the planes of the first and second steel plates 1, 2. Similarly, the double angles 44B that can be provided opposing each other via the joint plate 20B (and welded to the beam flange 34B and the joint plate 20B) can each have a substantially L-shape cross section taken along a direction parallel with the planes of the first and second steel plates 1, 2. The cutouts 21A and 21B can have a shape, size, dimension, etc., corresponding to the shape, size, dimension, etc., of the upper and lower beam flanges 34A and 34B, respectively. Although an upper pair of double angles 44A and a lower pair of double angles 44B are shown in FIGS. 3 and 4, two or more upper pairs of double angles 44A and two or more lower pairs of double angles 44B can be provided to secure the first and second joint plates 20A, 20B to the beam 33.

The cutout 21B provided in the lower joint plate 20B can receive the lower beam flange 34B of the beam 33 when the beam 33 is vertically lowered onto the lower joint plate 20B during manufacturing of the SC wall panel structure 100. Thus, the cutout 21B can facilitate positioning the beam 33 when the SC wall panel structure 100 is manufactured. Further, when the upper joint plate 20A and the first and second steel plates 1, 2 are assembled into an assembly such as the upper SC wall panel structure 100A shown in FIG. 2, and the assembly is vertically lowered upon one of the beams 33 already provided under the assembly in manufacturing the SC wall panel structure 100, the cutout 21A of the upper joint plate 20A can receive the upper flange 34A of the beam 33. The cutout 21A can thus facilitate positioning the assembly with respect to the beam 33.

Figure 5:
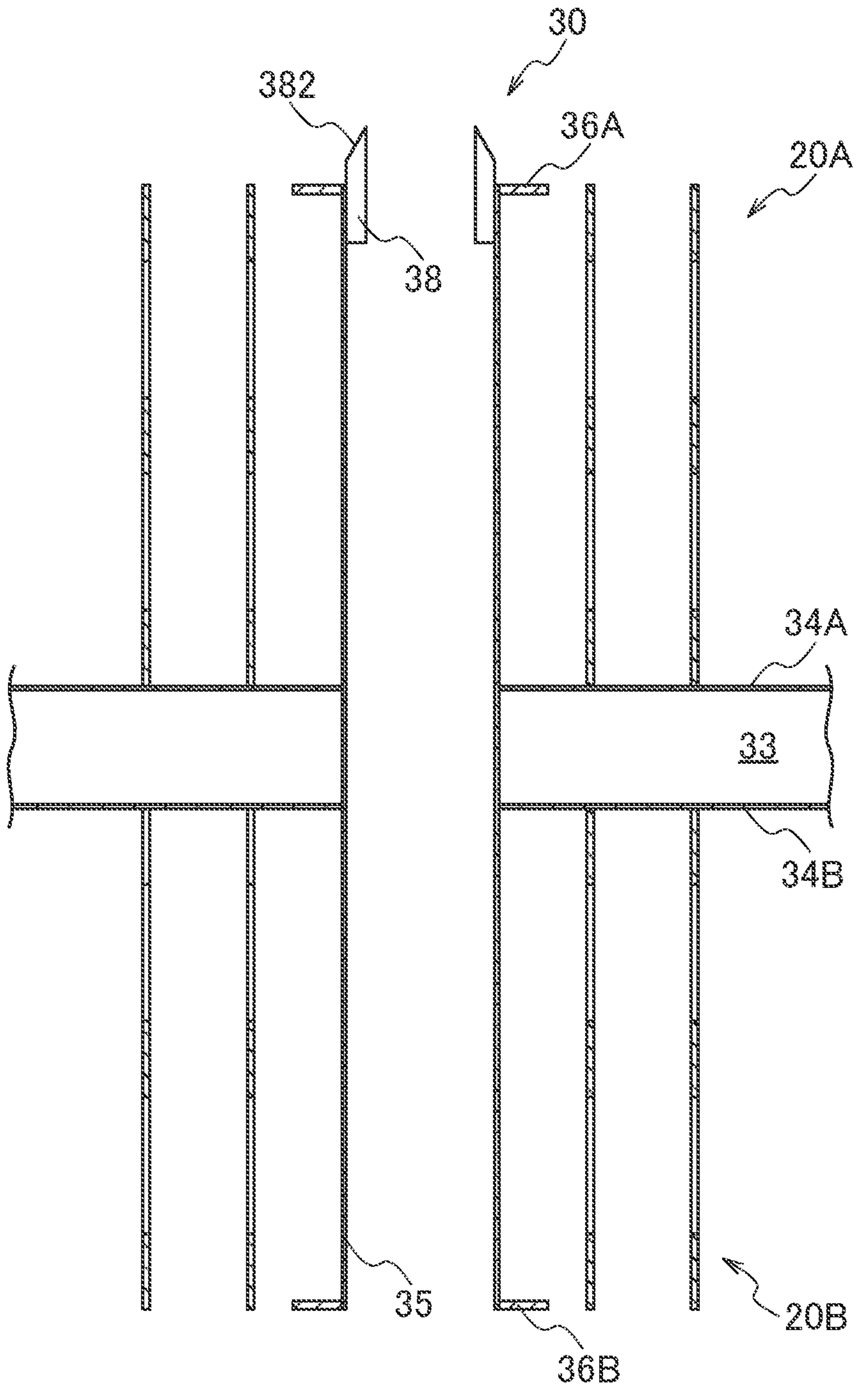
FIG. 5 is a cross-sectional view of the SC wall panel structure of FIG. 2 taken along the lines V-V in FIG. 2 in accordance with embodiments of the present technology.
Figure 6:
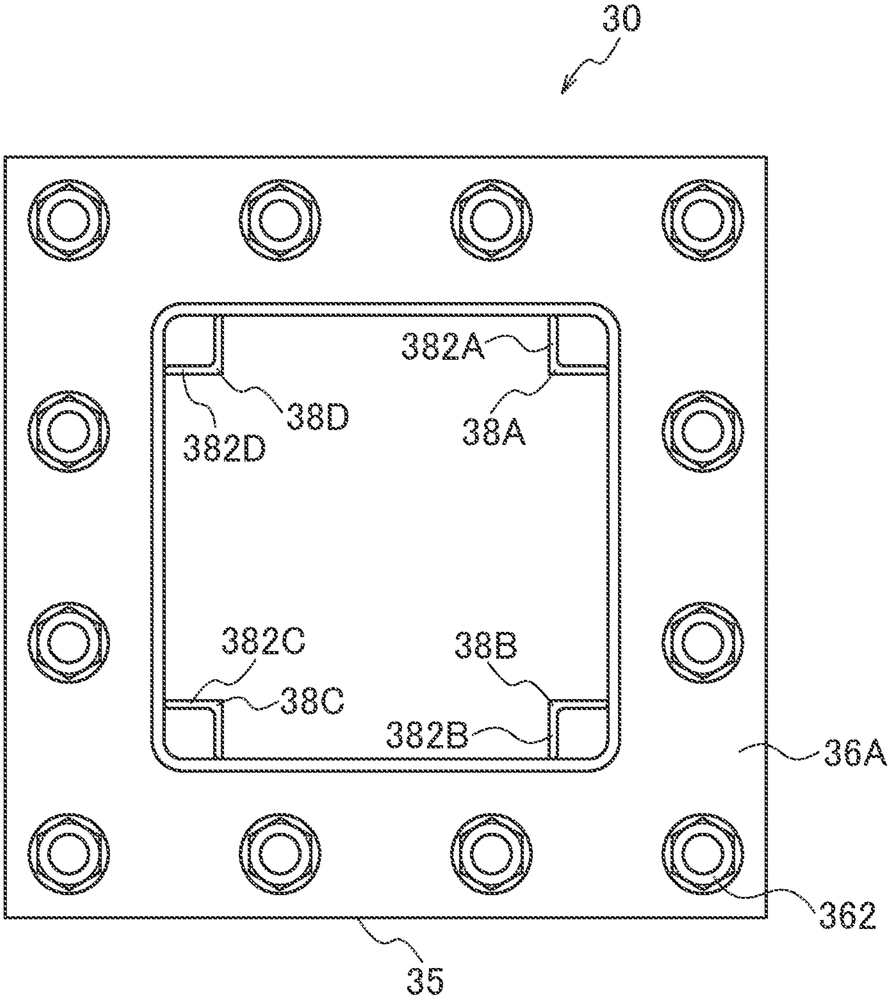
FIG. 6 is a top view of a column that can be included in the SC wall panel structure of FIG. 2 in accordance with embodiments of the present technology.

FIG. 5 is a cross-sectional view of the SC wall panel structure 100 of FIG. 2 taken along the lines V-V of FIG. 2 in accordance with embodiments of the present technology. FIG. 6 is a top view of the column 35 of FIGS. 2 and 5 in accordance with embodiments of the present technology. Referring to FIGS. 5 and 6 together, the column 35 of the column-beam assembly 30 are described in further detail.

In the illustrated embodiment, the column 35 is a tube formed from steel (e.g., stainless steel) and/or another suitably rigid material (e.g., metal), and has a rectilinear (e.g., square, rectangular) cross-sectional shape. Referring to FIG. 5, the column 35 can include an upper column flange 36A and a lower column flange 36B at the top end and the bottom end, respectively. When two columns 35 are vertically connected to each other as described herein, the two columns 35 can be configured such that the upper column flange 36A of one column 35 can be stacked over the lower column flange 36B of the other column 35. In this case, the upper column flange 36A of the one column 35 can be secured to the lower column flange 36B of the other column 35 via a plurality of bolts or other fasteners 362 as shown in FIG. 6. The bolts 362 are omitted in FIG. 5 for clarity.

Referring to FIG. 5, the top end of the column 35 can further include a functional portion 38. Referring to FIG. 6, the functional portion 38 can comprise functional portions 38A-38D (e.g., functional members) at the respective four corners of the rectangular-shaped column 35. Referring to FIGS. 5 and 6, each of the functional portions 38A-38D can be configured as an angle member that can extend vertically or longitudinally and have a substantially L-shaped cross-sectional shape in a horizontal and/or transverse direction. As shown in FIG. 5, each of the L-shaped angle members of the functional portions 38A-38D can be held by a respective predetermined-length portion in contact with a respective inner plane surface of the column 35, such that, in top view shown in FIG. 6, each of the functional portions 38A-38D can define a rectangular area at each of the four inner corners of the column 35 with the inner periphery of the column 35. The predetermined-length portion of the L-shaped angle members of the functional portion 38A-38D can be connected to the inner surface of the column 35 via welding or another suitable technique. The L-shaped angle members of the functional portions 38A-38D can be formed of steel material (e.g., stainless steel) and/or other suitably rigid materials (e.g., metal).

Referring to FIG. 5, each top end of the functional portion 38 can include an oblique portion 382 that can form a slope with respect to the longitudinal direction of the L-shaped angle member and the longitudinal direction (e.g., axis) of the column 35. Although the angle can be 30 degrees, for example, the angle can be smaller or greater than 30 degrees as long as the functional portion 38 can perform a guiding function as described in detail below.

While FIGS. 5 and 6 illustrated only a single column, when an upper one of the columns 35 (not shown) is suspended by a lifting device such as hoist or crane and moved downward aiming at a lower one of the columns 35 such that these two columns 35 can be vertically connected to each other, for example, each of the functional portions 38A-38D of the lower column 35 can have the top tips of the oblique portions 382 fall within a rectangular-shaped area defined by an inner rectangular contour of the lower column 35. Thus, the functional portions 38A-38D of the lower column 35 can allow the four corners of the lower end of the upper column 35, which are inside of the lower column flange 36B of the upper column 35, to slide along the oblique portions 382 such that the upper column 35 can be guided to an engagement position where these two columns 35 are aligned with each other. In the engagement position where the two columns 35 are aligned with each other, the upper column flange 36A of the lower column 35 can be stacked onto and overlapped with the lower column flange 36B of the upper column 35.

2. Select Methods of Manufacturing an SC Wall Panel Structure

Figure 7A:
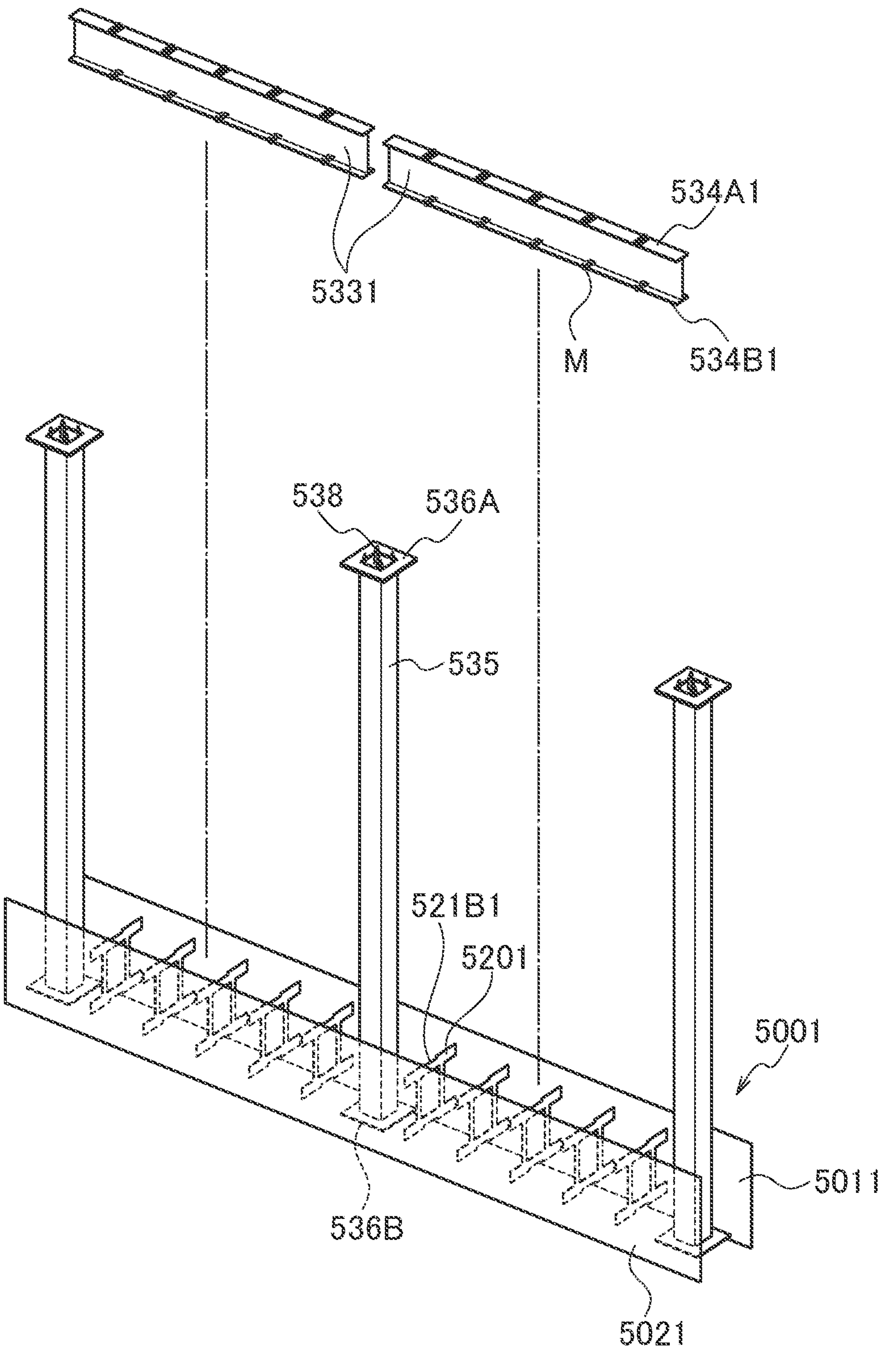
FIGS. 7A-7E are perspective views illustrating different steps of a method of manufacturing an SC wall panel structure in accordance with embodiments of the present technology.
Figure 7B:
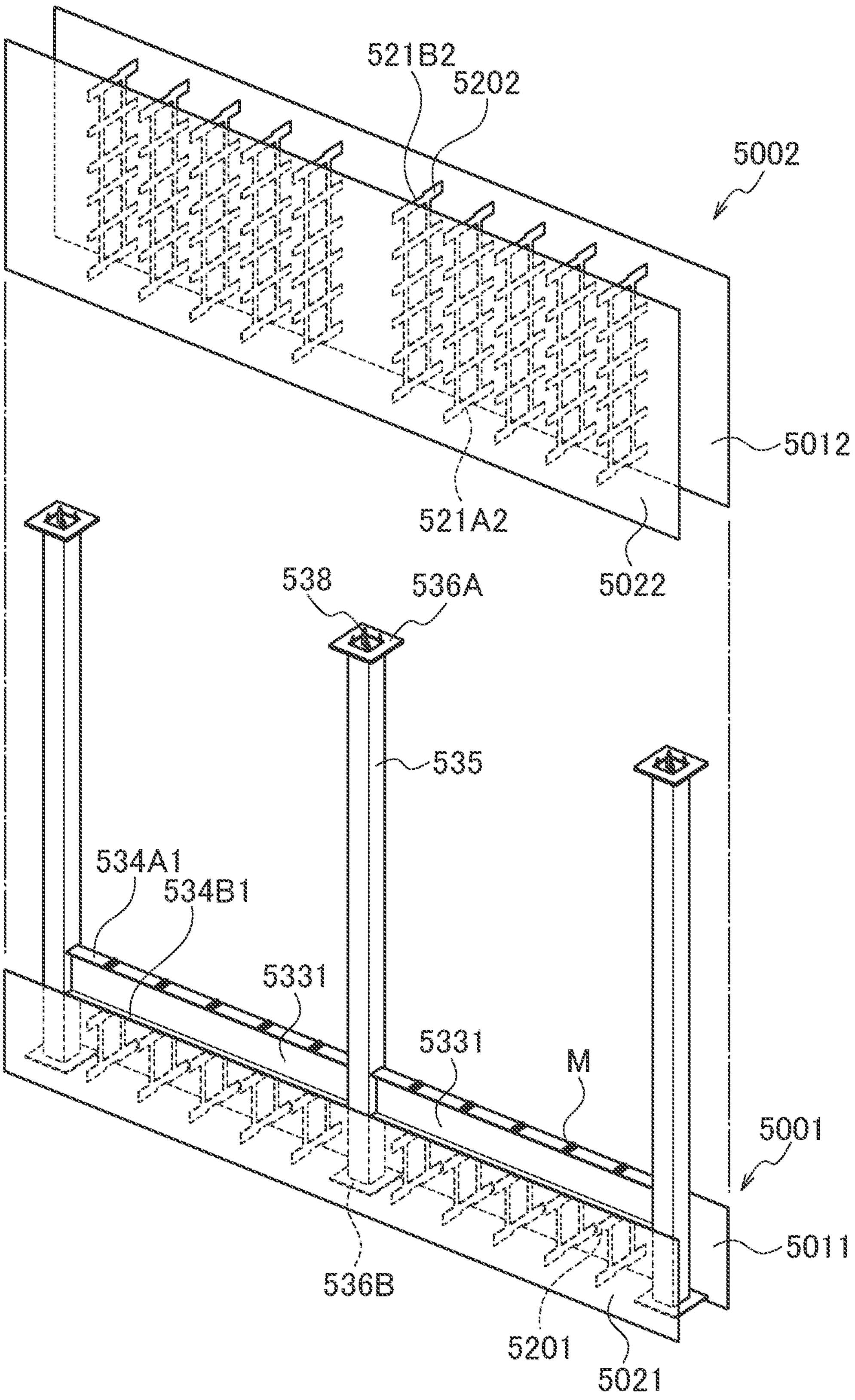
Figure 7C:
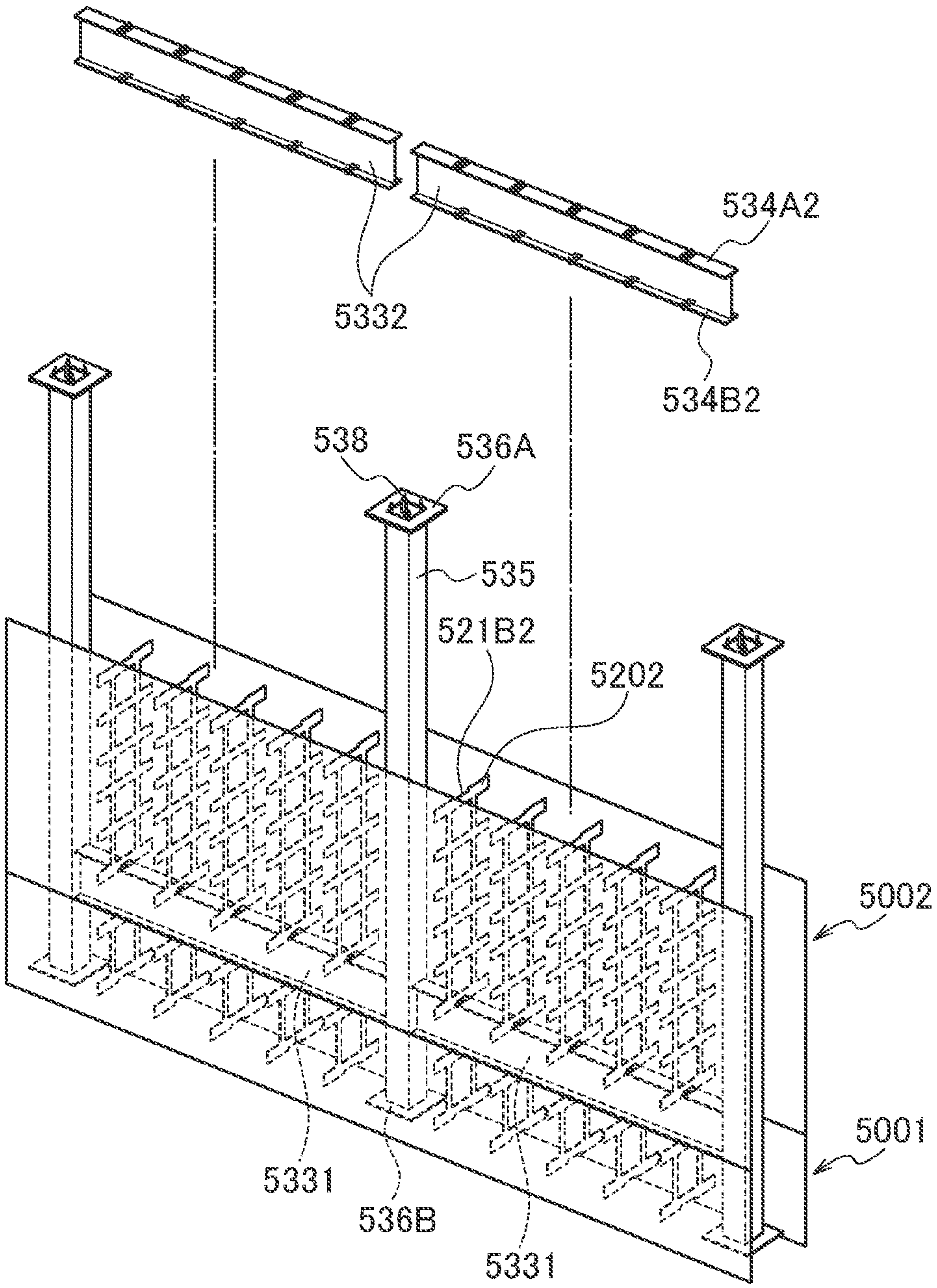
Figure 7D:
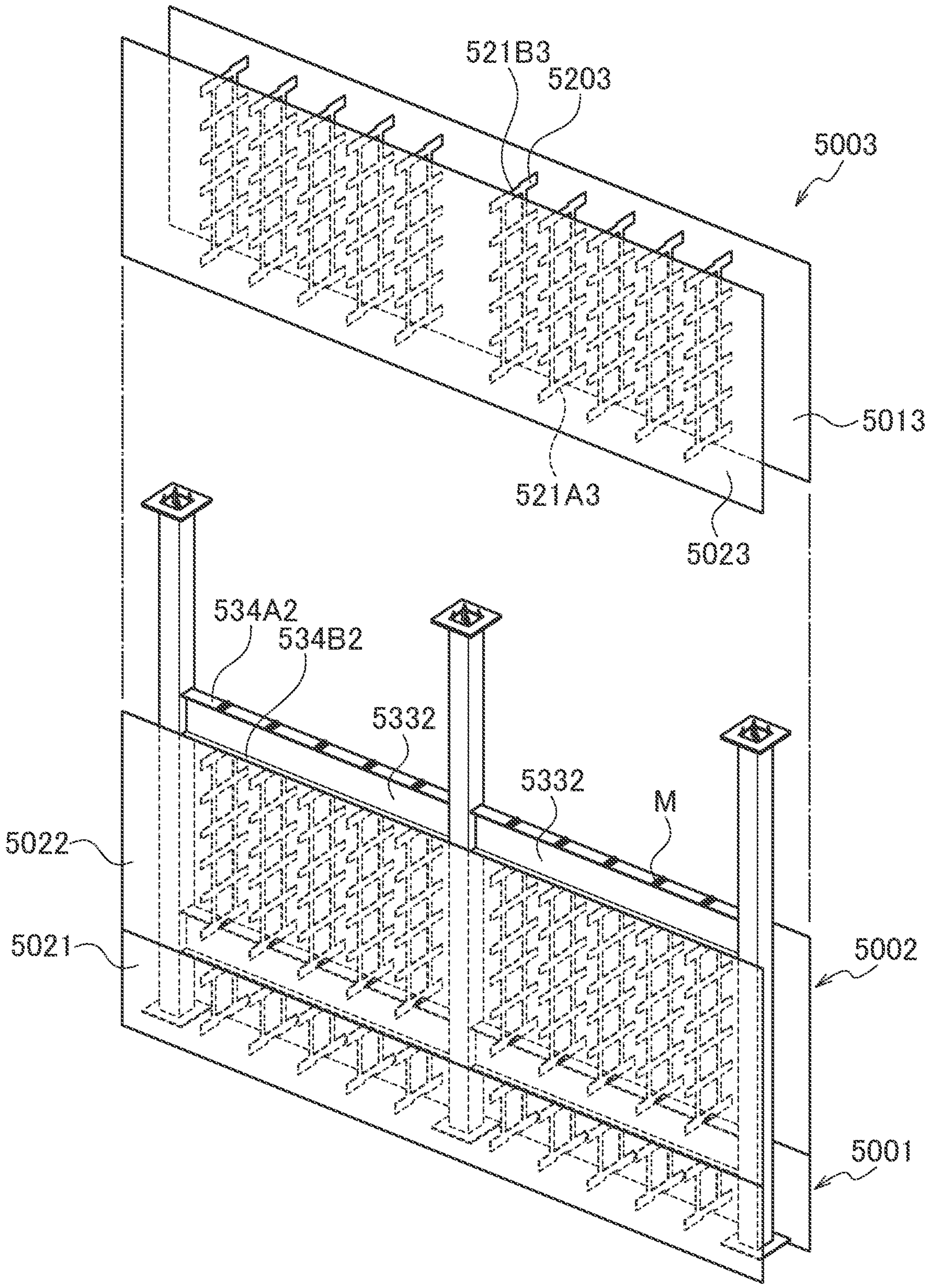
Figure 7E:
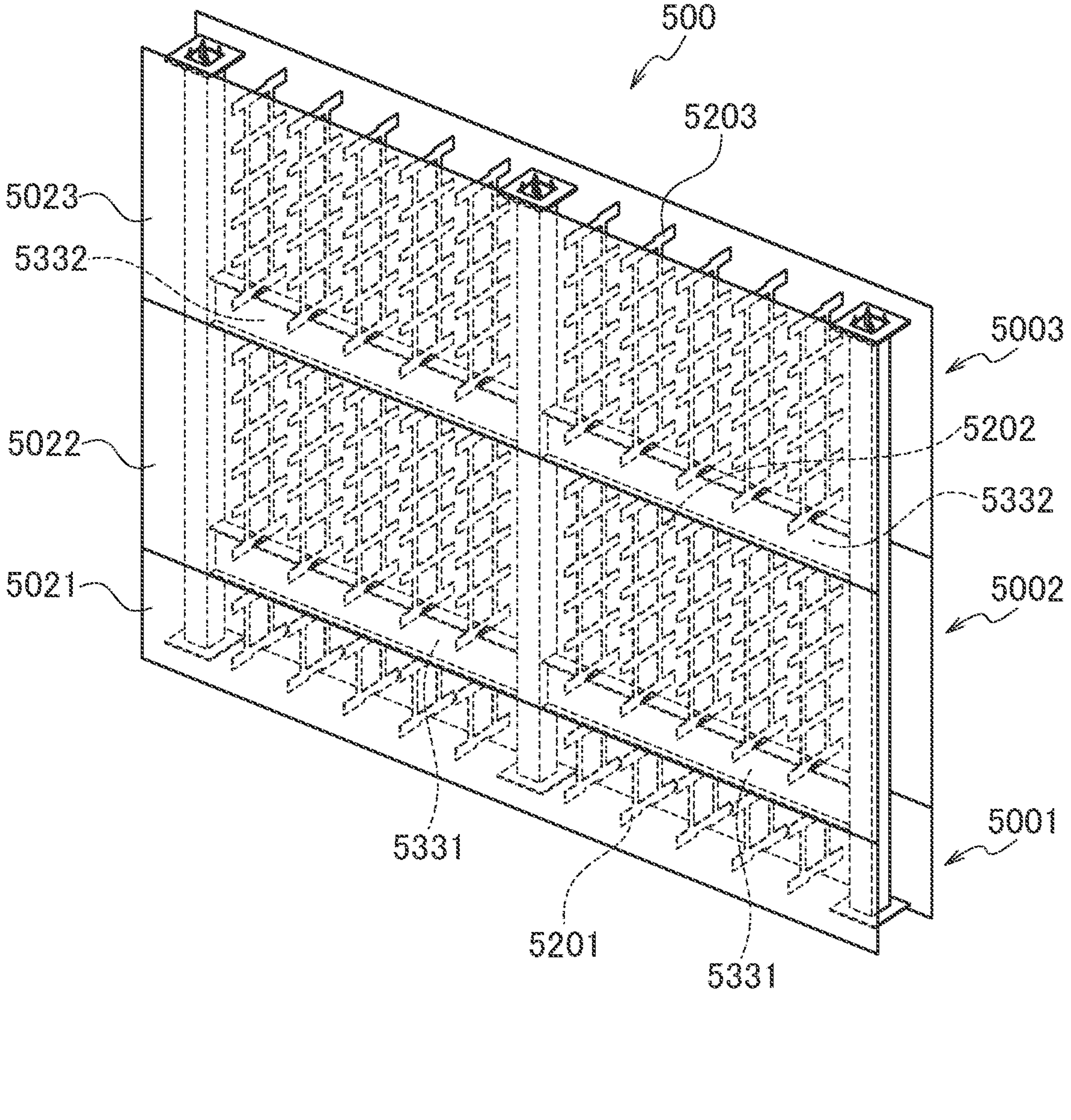

FIGS. 7A-7E are perspective views illustrating different steps of a method of manufacturing an SC wall panel structure 500 in accordance with embodiments of the present technology. Some features of the SC wall panel structure 500 can be generally or similar or identical to those of the SC wall panel structure 100 described in detail above with reference to FIGS. 2-6. FIG. 7A shows a first step by which a pair of first beams 5331 are stacked onto a first stage structure 5001. FIG. 7B shows a second step by which a second stage structure 5002 is stacked onto the pair of first beams 5331 after the first step. FIG. 7C shows a third step by which a pair of second beams 5332 are stacked onto the second stage structure 5002 after the second step. FIG. 7D shows a fourth step by which a third stage structure 5003 is stacked onto the pair of second beams 5332 after the third step. FIG. 7E shows that the fourth step is completed and the SC wall panel structure 500 is manufactured to have the first stage structure 5001 to the third stage structure 5003 connected in series.

Referring to FIG. 7A, the first stage structure 5001 (e.g., a lower structure assembly) includes an assembly of a first steel plate 5011, a second steel plate 5021, and a plurality of joint plates 5201 that connect the first steel plate 5011 to the second steel plate 5021. The first steel plate 5011, the second steel plate 5021, and the plurality of joint plates 5201 correspond to the first steel plate 1, the second steel plate 2, and the plurality of joint plates 20, respectively, as described in detail above with reference to FIGS. 2-6. In the illustrated embodiment, columns 535, each of which corresponds to the column 35 described in detail above with reference to FIGS. 2-6, are provided at three locations including a left location, a middle location, and a right location, which are arranged substantially along a straight line with a gap between adjacent ones. Each of the columns 535 can be adjacent to one or two respective ones of the joint plates 5201. For example, as shown in FIG. 7A, the column 35 at the left location or the right location is adjacent to one of the joint plates 5201, whereas the column 35 at the middle location is adjacent to and sandwiched by two joint plates 5201. Further, the columns 535 each have functional portions 538, each of which corresponds to the functional portion 38 described in detail above with reference to FIGS. 5 and 6. In the first stage structure 5001, the first steel plate 5011 and the second steel plate 5021 are connected to the joint plates 5201 by connection means such as welding, while the columns 535 may be connected to none of the first steel plate 5011, the second steel plate 5021, or the joint plates 5201.

With continuing reference to FIG. 7A, the pair of first beams 5331 are moved downward and stacked onto the first stage structure 5001 at the first step. When the pair of first beams 5331 are stacked onto the first stage structure 5001, upper cutouts 521B1 of the joint plates 5201 included in the first stage structure 5001 can receive lower beam flanges 534B1 of the first beams 5331. The cutouts 521B1, the first beams 5331, and the lower beam flanges 534B1 correspond respectively to the cutout 21B, the beam 33, and the lower beam flange 34B as described in detail above with reference to FIGS. 2-4. The joint plates 5201 can be connected to the first beams 5331 at connection locations M as shown in FIG. 7A, for example, using connection members such as double angles 44B as described above with reference to FIGS. 3 and 4. In addition, after the pair of first beams 5331 are stacked onto the first stage structure 5001, the pair of first beams 5331 can be connected directly to the three columns 535 or can be connected to the three columns 535 via connection members, each of which is provided around each column 535. Such connection members can be moment connections described in, for example. Chapter 10 of ANSI/AISC 358-16 ANSI/AISC 358s1-18, An American National Standard, Prequalified Connections for Special and Intermediate Steel Moment Frames for Seismic Applications, including Supplement No. 1, May 12, 2016, (includes 2018 supplement).

Referring to FIG. 7B, in the second step a second stage structure 5002 (e.g., middle structure assembly) including an assembly of a first steel plate 5012, a second steel plate 5022, and a plurality of joint plates 5202 is moved downward and stacked onto the pair of first beams 5331, which were stacked on the first stage structure 5001 and connected to the first stage structure 5001 by the joint plates 5201 during the first step. When the second stage structure 5002 is stacked onto the pair of first beams 5331, lower cutouts 521A1 of the joint plates 5202 included in the second stage structure 5002 can receive upper beam flanges 534A1 of the first beams 5331. The cutouts 521A2 and the upper beam flanges 534A1 correspond respectively to the cutout 21A and the upper beam flange 34A as described above with reference to FIGS. 2-4. In addition, a relationship between the first steel plate 5012, the second steel plate 5022, and the plurality of joint plates 5202 when assembled into the second stage structure 5002 is similar to a relationship between the first steel plate 5011, the second steel plate 5021, and the plurality of joint plates 5201 when assembled into the first stage structure 5001.

The joint plates 5202 can be connected to the first beams 5331 at connection locations M as shown in FIG. 7B using, for example, connection members such as double angles 44A as described in detail above with reference to FIGS. 3 and 4. The first steel plate 5011 and the second steel plate 5021 of the first stage structure 5001 can be connected respectively to the first steel plate 5012 and the second steel plate 5022 of the second stage structure 5002 by connection means such as welding. The weld line created during the welding can correspond to a boundary line depicted between the second steel plates 5021 and 5022 shown in FIG. 7C described below.

Referring to FIG. 7C, in the third step a pair of second beams 5332 are moved downward (e.g., lowered) and stacked onto the second stage structure 5002, which was stacked onto the pair of first beams 5331 and connected to the first beams 5331 by the joint plates 5202 during the second step. When the pair of second beams 5332 are stacked onto the second stage structure 5002, upper cutouts 521B2 of the joint plates 5202 included in the second stage structure 5002 can receive lower beam flanges 534B2 of the second beams 5332. A connection relationship between the joint plates 5202 and the second beams 5332 in the second stage structure 5002 can be similar to a connection relationship between the joint plates 5201 and the first beams 5331 in the first stage structure 5001 at the first step.

Referring to FIG. 7D, in the fourth step a third stage structure 5003 (e.g., an upper structure assembly) including an assembly of a first steel plate 5013, a second steel plate 5023, and a plurality of joint plates 5203 is moved downward and stacked onto the pair of second beams 5332, which were stacked on the second stage structure 5002 and connected to the second stage structure 5002 by the joint plates 5202 during the third step. When the third stage structure 5003 is stacked onto the pair of second beams 5332, lower cutouts 521A3 of the joint plates 5203 included in the third stage structure 5003 can receive upper beam flanges 534A2 of the second beams 5332. The cutouts 521A3, the second beams 5332, and the upper beam flanges 534A2 correspond respectively to the cutout 21A, the beam 33, and the upper beam flange 34A as described in detail above with reference to FIGS. 2-4. In addition, a relationship between the first steel plate 5013, the second steel plate 5023, and the plurality of joint plates 5203 when assembled into the third stage structure 5003 can be similar to a relationship between the first steel plate 5011, the second steel plate 5021, and the plurality of joint plates 5201 when assembled into the first stage structure 5001.

Again, the joint plates 5203 can be connected to the second beams 5332 at connection locations M as shown in FIG. 7D, for example, using connection members such as double angles 44A as described in detail above with reference to FIGS. 3 and 4. In some embodiments, the first steel plate 5012 and the second steel plate 5022 of the second stage structure 5002 are connected respectively to the first steel plate 5013 and the second steel plate 5023 of the third stage structure 5003 by connection means such as welding. The weld line created during the welding can correspond to a boundary line depicted between the second steel plates 5022 and 5023 shown in FIG. 7E described below.

Referring to FIG. 7E, the fourth step is completed and the SC wall panel structure 500 is manufactured to have the first stage structure 5001 to the third stage structure 5003 connected in series. The first beams 5331 and the second beams 5332 are connected to (i) the joint plates 5201, 5202, and 5203 vertically and adjacently in series and (ii) the three columns 535 horizontally and adjacently in series such that all these elements can be formed into the single SC wall panel structure 500.

Figure 8:
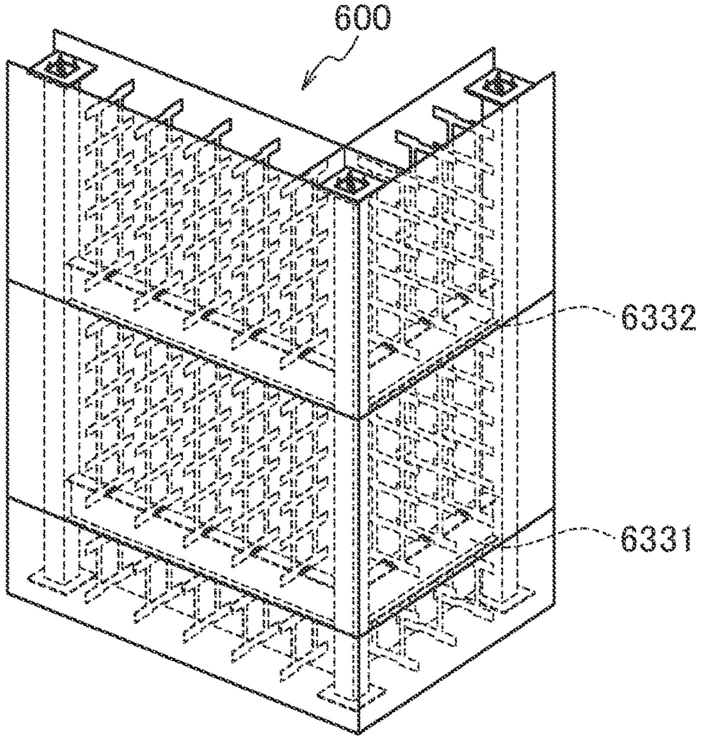
FIG. 8 is a perspective view of an SC wall panel structure in accordance with additional embodiments of the present technology.
Figure 9:
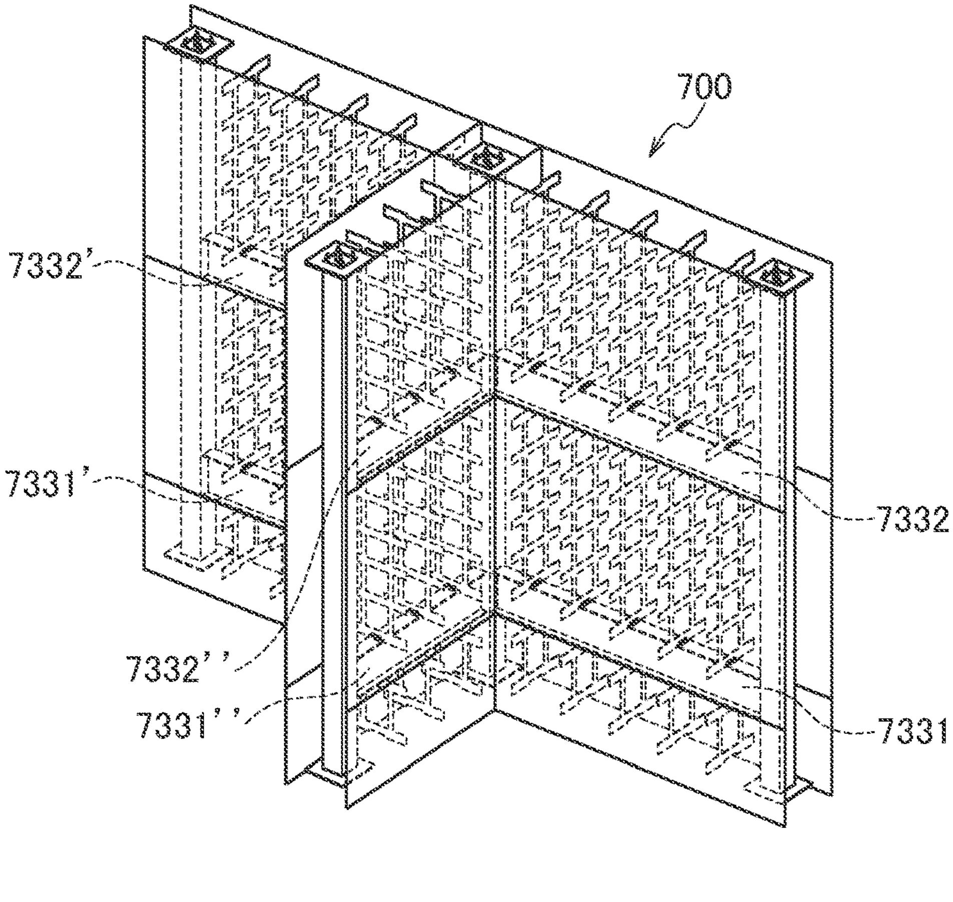
FIG. 9 is a perspective view of an SC wall panel structure in accordance with additional embodiments of the present technology.

Although FIGS. 7A-7E show that the SC wall panel structure 500 can be formed to extend along a plane (e.g., as a flat wall) in which the three columns 535 are arranged along a straight line extending horizontally and the pair of first beams 5331 and the pair of second beams 5332 between adjacent respective two columns of the three columns 535, the SC wall panel structure 500 is not limited to such a configuration. For example, as shown in FIG. 8, an SC wall panel structure 600 can be formed substantially in an L-shaped configuration in which a pair of first beams 6331 at lower level are arranged perpendicular to each other in a first horizontal plane and a pair of second beams 6332 at upper level are also arranged perpendicular to each other, but in a second horizontal plane above the first. Further, as shown in FIG. 9, an SC wall panel structure 700 can be formed substantially in a T-shaped configuration in which two first beams 7331 and 7331' at lower level are arranged to form a straight member and another first beam 7331" at lower level is arranged perpendicular to the straight member at a midpoint of the straight member in a first horizontal plane. Two second beams 7332 and 7332' are positioned at an upper level to form another straight member. Another second beam 7332", also at the upper level, is arranged perpendicular to the upper straight member at a midpoint of the upper straight member in a second horizontal plane above the first. It will be understood that the SC wall panel structures 600 and 700, which are formed substantially in an L-shaped configuration and a T-shaped configuration, respectively, can be manufactured according to a method similar to the method described referring to FIGS. 7A-7E.

The I-shaped, L-shaped, and T-shaped SC wall panel structures 500, 600, and 700 as described above can be formed into a module having a wide variety of configurations, for example, by vertically stacking an upper column 535 onto a lower column 535 to be aligned with each other according to the embodiments described referring to FIGS. 5 and 6 while vertically stacking an upper SC wall panel structure onto a lower SC wall panel structure via a beam sandwiched therebetween, and also horizontally arranging these stacked SC wall panel structures in any suitable combination.

Although the SC wall panel structures 100 and 500 are depicted to include the columns 35 and 535 extending vertically in the illustrated embodiments, an SC floor panel structure or an SC ceiling panel structure can be formed to include the columns 35 and 535 extending horizontally in a certain application. Thus, such SC wall panel structures, SC floor panel structures, and SC ceiling structures can be used to form a module. In particular, at least one of a side surface, a top surface, and a bottom surface of the module can be defined by such SC wall panel structures, SC floor panel structures, and SC ceiling structures.

Further, a plurality of modules formed using such SC wall panel structures, SC floor panel structures, and SC ceiling structures can be connected horizontally or vertically into a structure body.

In some aspects of the present technology, such SC wall panel structures, SC floor panel structures, and SC ceiling structures (hereinafter collectively referred to as structures) manufactured at an off-site location away from a construction site or at an on-site location can have a strength that can bear an inertia load (and/or other loads) experienced during the transportation from the off-site location to the on-site location. Specifically, the SC panel structures of the present technology can have a configuration in which a column-beam assembly is supported by joint plates sandwiched between the opposing steel plates to connect these steel plates to each other in the structures. When the structures form a portion of a module or a structure body after being transported to the on-site location, a space between the steel plates can be filled (or at least partially filled) with concrete. In addition, the associated columns, formed as a steel tube, can also be filled (or at least partially filled) with concrete, such that the structures can exhibit a structural strength that can prevent the structures from collapsing when used in the module or the structure body. Such a process of disposing concrete in the structures can be performed prior to the structures forming the module or the structure body. Alternatively, the concrete can be disposed in the module or the structure body after multiple modules and/or structure bodies have been assembled into a structure. Accordingly, the SC structures of the present technology can be strong enough to be shipped to an on-site location for assembly into a modular structure, while also being light enough to be practically shipped because they are not filled with concrete until assembly at the on-site location.

3. Select Nuclear Reactor Power Conversion System

Figure 10:
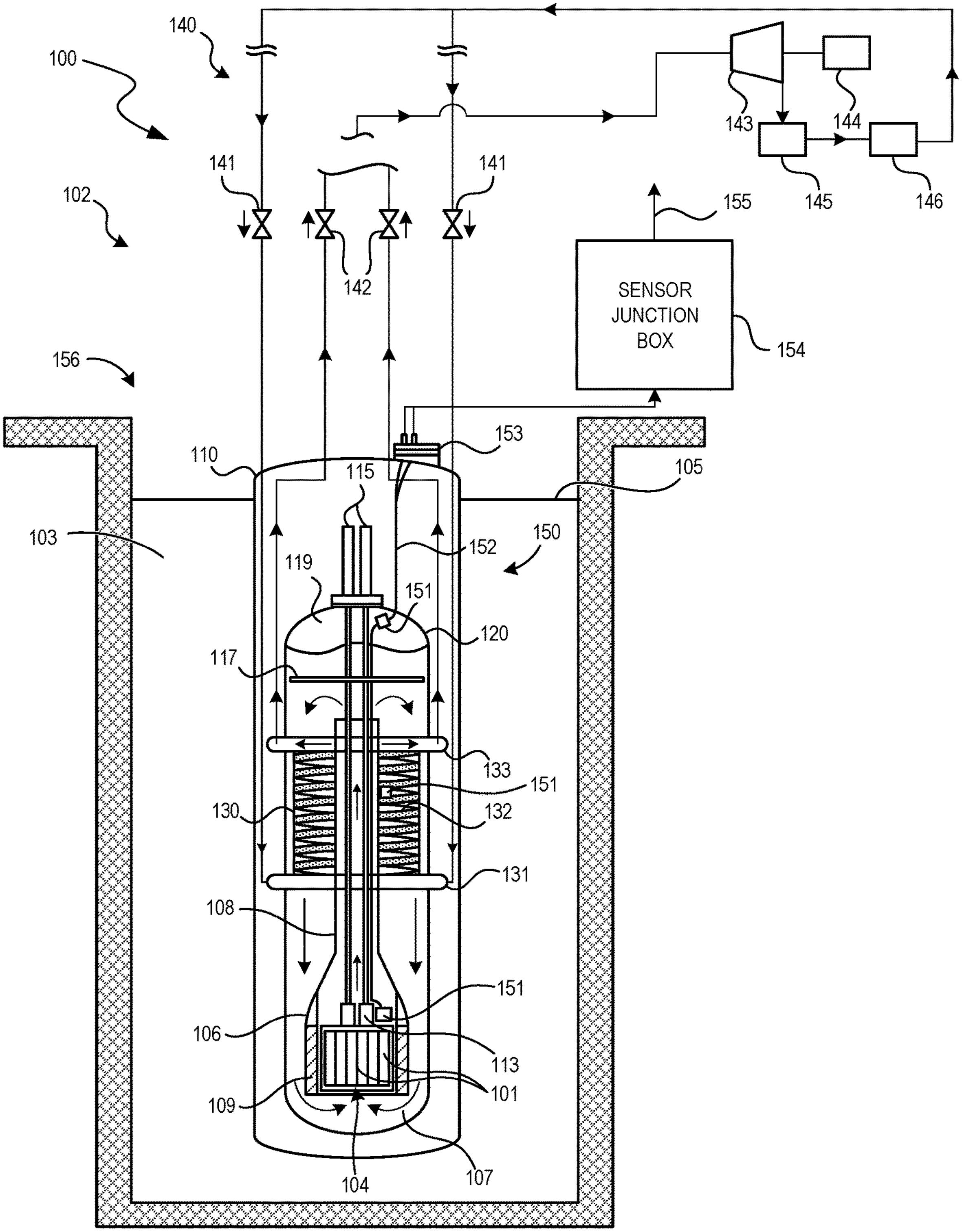
FIG. 10 is a partially schematic, partially cross-sectional view of a nuclear system configured in accordance with embodiments of the present technology and in which embodiments of the present technology may be used.
Figure 11:
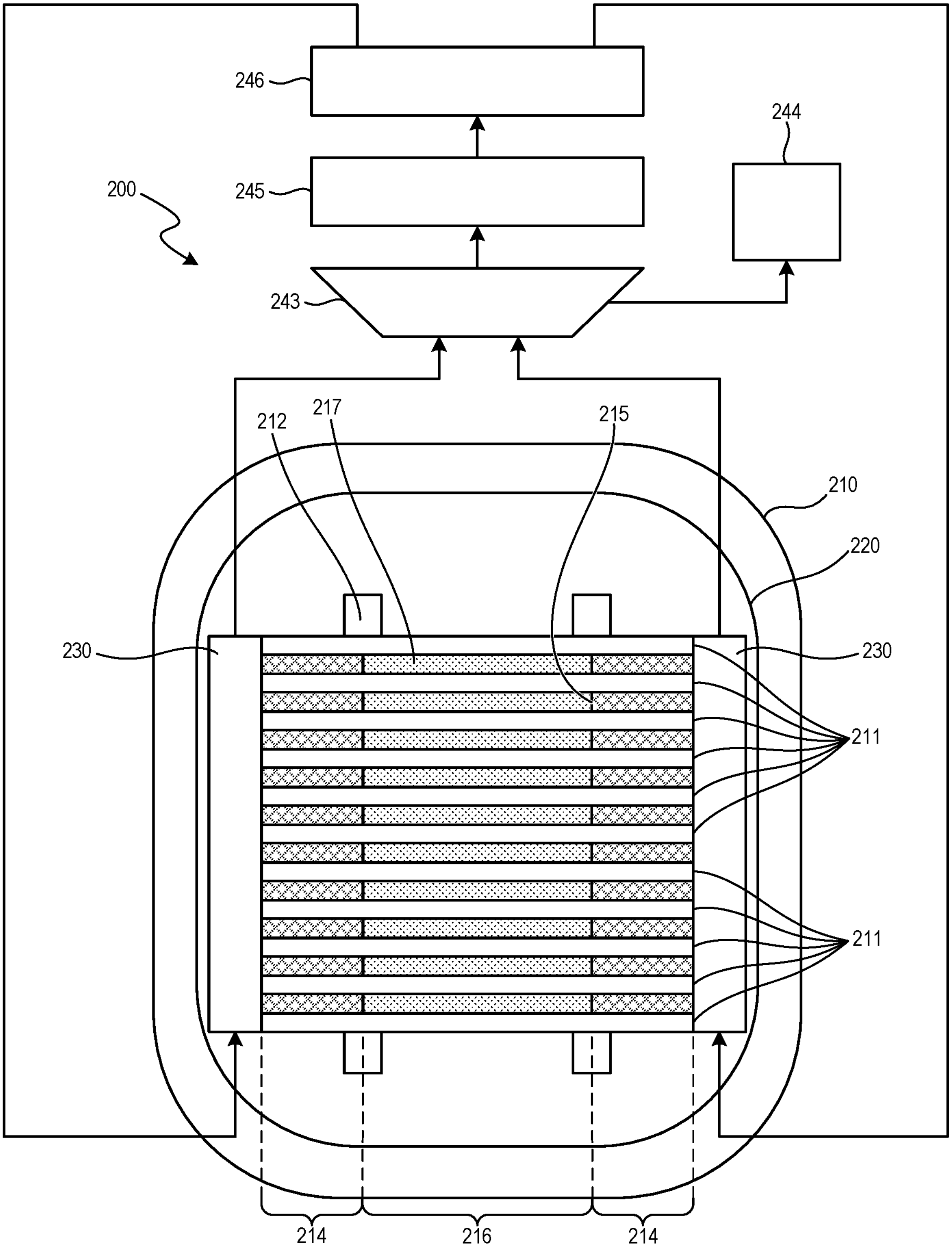
FIG. 11 is a partially schematic, partially cross-sectional view of a nuclear system configured in accordance with additional embodiments of the present technology and in which embodiments of the present technology may be used.

The SC panel structures of the present technology can be used to fully or partially enclose a nuclear reactor system. For example, the SC panel structures can form all or portion of a module that at least partially surrounds a nuclear reactor. The module can comprise, for example, a reactor building wall or enclosure. More specifically, FIGS. 10 and 11 illustrate representative nuclear reactors in which embodiments of the present technology may be used. FIG. 10 is a partially schematic, partially cross-sectional view of a nuclear reactor system 100 configured in accordance with embodiments of the present technology. The system 100 can include a power module 102 having a reactor core 104 in which a controlled nuclear reaction takes place. Accordingly, the reactor core 104 can include one or more fuel assemblies 101. The fuel assemblies 101 can include fissile and/or other suitable materials. Heat from the reaction generates steam at a steam generator 130, which directs the steam to a power conversion system 140. The power conversion system 140 generates electrical power, and/or provides other useful outputs. A sensor system 150 is used to monitor the operation of the power module 102 and/or other system components. The data obtained from the sensor system 150 can be used in real time to control the power module 102, and/or can be used to update the design of the power module 102 and/or other system components.

The power module 102 includes a containment vessel 110 (e.g., a radiation shield vessel, or a radiation shield container) that houses/encloses a reactor vessel 120 (e.g., a reactor pressure vessel, or a reactor pressure container), which in turn houses the reactor core 104. The containment vessel 110 can be housed in a power module bay 156. The power module bay 156 can contain a cooling pool 103 filled with water and/or another suitable cooling liquid. The bulk of the power module 102 can be positioned below a surface 105 of the cooling pool 103. Accordingly, the cooling pool 103 can operate as a thermal sink, for example, in the event of a system malfunction. In some embodiments, the SC structures of the present technology can be used to form at least part of the power module bay 156 and/or a further structure (e.g., a reactor building, a reactor structure) that houses the power module bay 156.

A volume between the reactor vessel 120 and the containment vessel 110 can be partially or completely evacuated to reduce heat transfer from the reactor vessel 120 to the surrounding environment (e.g., to the cooling pool 103). However, in other embodiments the volume between the reactor vessel 120 and the containment vessel 110 can be at least partially filled with a gas and/or a liquid that increases heat transfer between the reactor vessel 120 and the containment vessel 110.

Within the reactor vessel 120, a primary coolant 107 conveys heat from the reactor core 104 to the steam generator 130. For example, as illustrated by arrows located within the reactor vessel 120, the primary coolant 107 is heated at the reactor core 104 toward the bottom of the reactor vessel 120. The heated primary coolant 107 (e.g., water with or without additives) rises from the reactor core 104 through a core shroud 106 and to a riser tube 108. The hot, buoyant primary coolant 107 continues to rise through the riser tube 108, then exits the riser tube 108 and passes downwardly through the steam generator 130. The steam generator 130 includes a multitude of conduits 132 that are arranged circumferentially around the riser tube 108, for example, in a helical pattern, as is shown schematically in FIG. 10. The descending primary coolant 107 transfers heat to a secondary coolant (e.g., water) within the conduits 132, and descends to the bottom of the reactor vessel 120 where the cycle begins again. The cycle can be driven by the changes in the buoyancy of the primary coolant 107, thus reducing or eliminating the need for pumps to move the primary coolant 107.

The steam generator 130 can include a feedwater header 131 at which the incoming secondary coolant enters the steam generator conduits 132. The secondary coolant rises through the conduits 132, converts to vapor (e.g., steam), and is collected at a steam header 133. The steam exits the steam header 133 and is directed to the power conversion system 140.

The power conversion system 140 can include one or more steam valves 142 that regulate the passage of high pressure, high temperature steam from the steam generator 130 to a steam turbine 143. The steam turbine 143 converts the thermal energy of the steam to electricity via a generator 144. The low-pressure steam exiting the turbine 143 is condensed at a condenser 145, and then directed (e.g., via a pump 146) to one or more feedwater valves 141. The feedwater valves 141 control the rate at which the feedwater re-enters the steam generator 130 via the feedwater header 131.

The power module 102 includes multiple control systems and associated sensors. For example, the power module 102 can include a hollow cylindrical reflector 109 that directs neutrons back into the reactor core 104 to further the nuclear reaction taking place therein. Control rods 113 are used to modulate the nuclear reaction, and are driven via fuel rod drivers 115. The pressure within the reactor vessel 120 can be controlled via a pressurizer plate 117 (which can also serve to direct the primary coolant 107 downwardly through the steam generator 130) by controlling the pressure in a pressurizing volume 119 positioned above the pressurizer plate 117.

The sensor system 150 can include one or more sensors 151 positioned at a variety of locations within the power module 102 and/or elsewhere, for example, to identify operating parameter values and/or changes in parameter values. The data collected by the sensor system 150 can then be used to control the operation of the system 100, and/or to generate design changes for the system 100. For sensors positioned within the containment vessel 110, a sensor link 152 directs data from the sensors to a flange 153 (at which the sensor link 152 exits the containment vessel 110) and directs data to a sensor junction box 154. From there, the sensor data can be routed to one or more controllers and/or other data systems via a data bus 155.

FIG. 11 is a partially schematic, partially cross-sectional view of a nuclear reactor system 200 ("system 200") configured in accordance with additional embodiments of the present technology. In some embodiments, the system 200 can include some features that are at least generally similar in structure and function, or identical in structure and function, to the corresponding features of the system 100 described in detail above with reference to FIG. 10, and can operate in a generally similar or identical manner to the system 100.

In the illustrated embodiment, the system 200 includes a reactor vessel 220 and a containment vessel 210 surrounding/enclosing the reactor vessel 220. In some embodiments, the reactor vessel 220 and the containment vessel 210 can be roughly cylinder-shaped or capsule-shaped. In some embodiments the reactor vessel 220 and the containment vessel can be positioned in a reactor housing, a reactor bay, a reactor building, and/or the like formed from one or more of the SC structures of the present technology.

The system 200 further includes a plurality of heat pipe layers 211 within the reactor vessel 220. In the illustrated embodiment, the heat pipe layers 211 are spaced apart from and stacked over one another. In some embodiments, the heat pipe layers 211 can be mounted/secured to a common frame 212, a portion of the reactor vessel 220 (e.g., a wall thereof), and/or other suitable structures within the reactor vessel 220. In other embodiments, the heat pipe layers 211 can be directly stacked on top of one another such that each of the heat pipe layers 211 supports and/or is supported by one or more of the other ones of the heat pipe layers 211.

In the illustrated embodiment, the system 200 further includes a shield or reflector region 214 at least partially surrounding a core region 216. The heat pipes layers 211 can be circular, rectilinear, polygonal, and/or can have other shapes, such that the core region 216 has a corresponding three-dimensional shape (e.g., cylindrical, spherical). In some embodiments, the core region 216 is separated from the reflector region 214 by a core barrier 215, such as a metal wall. The core region 216 can include one or more fuel sources, such as fissile material, for heating the heat pipes layers 211. The reflector region 214 can include one or more materials configured to contain/reflect products generated by burning the fuel in the core region 216 during operation of the system 200. For example, the reflector region 214 can include a liquid or solid material configured to reflect neutrons and/or other fission products radially inward toward the core region 216. In some embodiments, the reflector region 214 can entirely surround the core region 216. In other embodiments, the reflector region 214 may partially surround the core region 216. In some embodiments, the core region 216 can include a control material 217, such as a moderator and/or coolant. The control material 217 can at least partially surround the heat pipe layers 211 in the core region 216 and can transfer heat therebetween.

In the illustrated embodiment, the system 200 further includes at least one heat exchanger 230 (e.g., a steam generator) positioned around the heat pipe layers 211. The heat pipe layers 211 can extend from the core region 216 and at least partially into the reflector region 214, and are thermally coupled to the heat exchanger 230. In some embodiments, the heat exchanger 230 can be positioned outside of or partially within the reflector region 214. The heat pipe layers 211 provide a heat transfer path from the core region 216 to the heat exchanger 230. For example, the heat pipe layers 211 can each include an array of heat pipes that provide a heat transfer path from the core region 216 to the heat exchanger 230. When the system 200 operates, the fuel in the core region 216 can heat and vaporize a fluid within the heat pipes in the heat pipe layers 211, and the fluid can carry the heat to the heat exchanger 230.

In some embodiments, the heat exchanger 230 can be similar to the steam generator 130 of FIG. 10 and, for example, can include one or more helically-coiled tubes that wrap around the heat pipe layers 211. The tubes of the heat exchanger 230 can include or carry a working fluid (e.g., a coolant such as water or another fluid) that carries the heat from the heat pipe layers 211 out of the reactor vessel 220 and the containment vessel 210 for use in generating electricity, steam, and/or the like. For example, in the illustrated embodiment the heat exchanger 230 is operably coupled to a turbine 243, a generator 244, a condenser 245, and a pump 246. As the working fluid within the heat exchanger 230 increases in temperature, the working fluid may begin to boil and vaporize. The vaporized working fluid (e.g., steam) may be used to drive the turbine 243 to convert the thermal potential energy of the working fluid into electrical energy via the generator 244. The condenser 245 can condense the working fluid after it passes through the turbine 243, and the pump 246 can direct the working fluid back to the heat exchanger 230 where it can begin another thermal cycle.

4. Additional Examples

The following examples are illustrative of several embodiments of the present technology:

1. A panel structure, comprising:
   - a first plate;
   - a second plate spaced apart from and positioned parallel to the first plate;
   - a support assembly positioned between the first plate and the second plate, wherein the support assembly includes—
     - a column extending along a longitudinal axis; and
     - a beam extending from the column parallel to the first plate and the second plate and perpendicular to the longitudinal axis; and
   - a plurality of joint plates extending between the first plate and the second plate and connecting the first plate to the second plate, wherein the joint plates are spaced apart from and extend parallel to one another, and wherein at least one of the joint plates is coupled to the beam to support the beam.

2. The panel structure of example 1 wherein the beam is a first beam extending from the column in a first direction, wherein the support assembly further comprises a second beam extending from the column in a second direction parallel to the first plate and the second plate, wherein the second direction is opposite to the first direction, wherein the first direction and the second direction are perpendicular to the longitudinal axis, wherein a first set of the joint plates is coupled to the first beam to support the first beam, and wherein a second set of the joint plates is coupled to the second beam to support the second beam.

3. The panel structure of example 1 or example 2 wherein the beam comprises an I-section beam or an H-section beam.

4. The panel structure of example 3 wherein the at least one of the joint plates is connected to the I-section beam or the H-section beam by double angles.

5. The panel structure of any one of examples 1-4 wherein the joint plates comprise a plurality of lower joint plates arranged in a first row and a plurality of upper joint plates arranged in a second row, and wherein the beam extends between the lower joint plates and the upper joint plates.

6. The panel structure of example 5 wherein a lower portion of individual ones of the upper joint plates is fixedly attached to an upper portion of the beam, and wherein an upper portion of individual ones of the lower joint plates is fixedly attached to a lower portion of the beam.

7. The panel structure of example 6 wherein the individual ones of the lower portions of the upper joint plates include a first cutout shaped to receive the upper portion of the beam therein, and wherein individual ones of the upper portions of the lower joint plates include a second cutout shaped to receive the lower portion of the beam therein.

8. The panel structure of example 5 or example 6 wherein the upper portion of the beam comprises an upper flange, and wherein the lower portion of the beam comprises a lower flange.

9. The panel structure of example 8 wherein the individual ones of the lower portions of the upper joint plates include a first cutout shaped to receive the upper flange of the beam therein, and wherein individual ones of the upper portions of the lower joint plates include a second cutout shaped to receive the lower flange of the beam therein.

10. The panel structure of any one of examples 1-9 wherein the column includes an upper end portion, and wherein the support assembly further includes at least one functional member coupled to the upper end portion and having an upper portion obliquely angled relative to the longitudinal axis of the column.

11. The panel structure of any one of examples 1-10, further comprising a fill material between the first plate and the second plate and surrounding the support assembly and the joint plates.

12. A panel structure, comprising:
   - a first plate;
   - a second plate spaced apart from and positioned parallel to the first plate;

a plurality of upper joint plates extending between the first plate and the second plate, wherein the upper joint plates are spaced apart from and extend parallel to one another;

a plurality of lower joint plates extending between the first plate and the second plate, wherein the upper joint plates are spaced apart from and extend parallel to one another;

a column positioned between the first plate and the second plate; and a beam extending from the column between the upper joint plates and the lower joint plates parallel to the first plate and the second plate.

13. The panel structure of example 12 wherein a lower portion of individual ones of the upper joint plates includes a first cutout shaped to receive and be fixedly attached to an upper portion of the beam, and wherein an upper portion of individual ones of the lower joint plates includes a first cutout shaped to receive and be fixedly attached to a lower portion of the beam.

14. The panel structure of example 12 or example 13 wherein the beam is a first beam extending from the column in a first direction parallel to the first plate and the second plate, and further comprising a second beam extending from the column between the upper joint plates and the lower joint plates in a second direction parallel to the first plate and the second plate, wherein the second direction is opposite to the first direction 15. A method of manufacturing a structure, the method comprising:

providing— a lower structure assembly including— a first lower plate;

a second lower plate spaced apart from and parallel to the first upper plate; and a plurality of lower joint plates extending between the first lower plate and the second lower plate and connecting the first lower plate to the second lower plate;

at least one beam between the first lower plate and the second lower plate, wherein the at least one beam is positioned on and supported by the lower joint plates; and an upper structure assembly including— a first upper plate;

a second upper plate spaced apart from and extending parallel to the first upper plate; and a plurality of upper joint plates extending between the first upper plate and the second upper plate and connecting the first upper plate to the second upper plate;

coupling the upper structure assembly to the lower structure assembly such that the upper joint plates are positioned on and supported by the at least one beam;

connecting the first upper plate to the first lower plate; and connecting the second upper plate to the second lower plate.

16. The method of example 15 wherein the method further comprises disposing a fill material between the first lower plate and the second lower plate and between the first upper plate and the second upper plate such that the fill material surrounds the at least one beam, the lower joint plates, and the upper joint plates.

17. The method of example 16 wherein the method further comprises coupling the upper structure assembly to the lower structure assembly, connecting the first upper plate to the first lower plate, and connecting the second upper plate to the second lower plate at a first location, and wherein disposing the fill material includes disposing the fill material at a second location remote from the first location.

18. The method of any one of examples 15-17 wherein the method further comprises providing a column between the first lower plate and the second lower plate, and wherein coupling the upper structure assembly to the lower structure assembly includes positioning the column between an adjacent pair of the upper joint plates.

19. The method of any one of examples 15-18 wherein individual ones of the upper joint plates include a cutout, and wherein coupling the upper structure assembly to the lower structure assembly includes positioning the at least one beam within the cutouts.

20. The method of any one of examples 15-19 wherein the first lower plate, the second lower plate, the first upper plate, and the second upper plate comprise steel.

21. A structure forming a module, the structure comprising:

two steel plates arranged respectively on one side and the other side opposing each other in parallel;

a plurality of joint plates extending in parallel with and separately from each other between the two steel plates to connect the two steel plates to each other, a plane along which the plurality of joint plates extend being perpendicular to a plane along with the two steel plates extend;

a column disposed between adjacent joint plates of the plurality of joint plates and between the two steel plates; and two beams extending between the two steel plates from the column in opposing directions along which the two steel plates extend, the opposing directions being perpendicular to a longitudinal direction of the column, each of the plurality of joint plates being configured to support the two beams.

22. The structure of example 21 wherein each of the plurality of joint plates is configured to position the two beams between the two steel plates.

23. The structure of example 21 or example 22 wherein the column and the two beams forms a column-beam assembly.

24. The structure of any one of examples 21-23 wherein the column is formed as a rectangular steel tube.

25. The structure of any one of examples 21-24 wherein each of the two beams is formed as an I-section beam or H-section beam.

26. The structure of example 52 wherein at least one of the plurality of joint plates is connected to the I-section beam or H-section beam by double angles.

27. The structures of example 25 or 26 wherein at least one of the plurality of joint plates includes a cutout to abut and receive the I-section beam or H-section beam.

28. The structure of any one of examples 21-27 wherein the structure includes a first structure and a second structure adjacent to each other in a longitudinal direction of the column, a steel plate on the one side of the first structure and a steel plate on the one side of the second structure being connected to each other by welding.

29. The structure of example 28 wherein the first structure and the second structure shares the two beams.

30. The structure of example 28 or 29 wherein the column of the second structure is aligned with the column of the first structure by a weight of the second structure that is stacked on the first structure prior to the welding.

31. The structure of example 30 wherein a plurality of functional portions provided at a top end of the column of the first structure engages with a bottom end of the column of the second structure.

32. The structure of example 31 wherein each of the plurality of functional portions includes a part angled with respect to the direction along which the columns extend.

33. The structure of example 31 or example 32 wherein the column of each of the first and second structures is configured as a rectangular steel tube, the plurality of functional portions of the first structure being provided respectively at four corners of the rectangular steel tube.

34. The structure of example 33 wherein the two beams and the column are connected to each other to convey moment load therebetween in the column-beam assembly.

35. The structure of any one of examples 21-34 wherein at least one of a side surface, a top surface, and a bottom surface of the module is defined by the structure formed off site.

36. A module comprising a side surface, a top surface, and a bottom surface, at least one of which is defined by one or more structures, each of the one or more structures including:

two steel plates arranged respectively on one side and the other side opposing each other in parallel;

a plurality of joint plates extending in parallel with and separately from each other between the two steel plates to connect the two steel plates to each other, a plane along which the plurality of joint plates extend being perpendicular to a plane along with the two steel plates extend;

a column disposed between adjacent joint plates of the plurality of joint plates and between the two steel plates; and two beams extending between the two steel plates from the column in opposing directions along which the two steel plates extend, the opposing directions being perpendicular to a longitudinal direction of the column, each of the plurality of joint plates being configured to support the two beams.

37. The module of example 36 wherein each of the plurality of joint plates is configured to position the two beams between the two steel plates.

38. The module of example 36 or example 37 wherein one or more pieces of equipment is included in the module.

39. The module of any one of examples 36-38 wherein, after the at least one of the side surface, the top surface, and the bottom surface of the module is defined by the one or more structures, concrete is filled between the two steel plates.

40. The module of example 39 wherein studs protrude from the respective two steel plates to be integrated into the concrete.

41. A structure body comprising a plurality of modules vertically or horizontally connected to each other, at least one of the plurality of modules including a side surface, a top surface, and a bottom surface, at least one of which is defined by one or more structures, each of the one or more structures including:

two steel plates arranged respectively on one side and the other side opposing each other in parallel;

a plurality of joint plates extending in parallel with and separately from each other between the two steel plates to connect the two steel plates to each other, a plane along which the plurality of joint plates extend being perpendicular to a plane along with the two steel plates extend;

a column disposed between adjacent joint plates of the plurality of joint plates and between the two steel plates; and two beams extending between the two steel plates from the column in opposing directions along which the two steel plates extend, the opposing directions being perpendicular to a longitudinal direction of the column, each of the plurality of joint plates being configured to support the two beams, a space defined between the two steel plates being filled with concrete.

42. A method of manufacturing a structure, the method comprising:

providing a lower structure member including a first lower steel plate and a second lower steel plate arranged respectively on one side and the other side opposing each other in parallel, and a plurality of lower joint plates extending in parallel with and separately from each other between the first lower steel plate and the second lower steel plate to connect the first lower steel plate to the second lower steel plate;

providing a column between the first lower steel plate and the second lower steel plate and between a pair of lower joint plates adjacent to each other among the plurality of lower joint plates;

providing a pair of beams extending in opposite directions from the column between the first lower steel plate and the second lower steel plate to be supported by the plurality of lower joint plates;

connecting the pair of beams to the column;

providing an upper structure member including a first upper steel plate and a second upper steel plate arranged respectively on the one side and the other side opposing each other in parallel, and a plurality of upper joint plates extending in parallel with and separately from each other between the first upper steel plate and the second upper steel plate to connect the first upper steel plate to the second upper steel plate;

providing the upper structure member over the lower structure member such that the plurality of upper joint plates are placed on the pair of beams while the column is disposed between a pair of upper joint plates adjacent with each other among the plurality of upper joint plates; and connecting the first upper steel plate and the second upper steel plate to the first lower steel plate and the second lower steel plate, respectively.

43. The method of example 42 wherein cutouts opening upward and configured to receive the pair of beams are provided on respective tops of the plurality of lower joint plates.

44. The method of example 42 or example 43 wherein cutouts opening downward and configured to receive the pair of beams are provided on respective bottoms of the plurality of upper joint plates.

45. A method of manufacturing a module, the method comprising:

forming a structure; and defining at least one of a side surface, a top surface, and a bottom surface of the module by the structure, the structure including:

two steel plates arranged respectively on one side and the other side opposing each other in parallel;

a plurality of joint plates extending in parallel with and separately from each other between the two steel plates to connect the two steel plates to each other, a plane along which the plurality of joint plates extend being perpendicular to a plane along with the two steel plates extend;

a column disposed between adjacent joint plates of the plurality of joint plates and between the two steel plates; and two beams extending between the two steel plates from the column in opposing directions along which the two steel plates extend, the opposing directions being perpendicular to a longitudinal direction of the column, each of the plurality of joint plates being configured to support the two beams, wherein the structure includes a first structure and a second structure adjacent to each other in a longitudinal direction of the column, the step of forming the structure including:

engaging a first column of the first structure with a second column of the second structure to form the column; and connecting first steel plates on the one side and the other side of the first structure respectively to second steel plates on the one side and the other side of the second structure to form the two steel plates, and the method further comprising filling concrete into a space defined between the two steel plates.

46. The method of example 45 wherein the step of engaging includes engaging a first column of the first structure disposed vertically below with a second column of the second structure disposed vertically above.

47. A method of manufacturing a structure body, the method comprising:

forming a plurality of modules; and connecting the plurality of module vertically or horizontally to each other, the step of forming the plurality of modules including:

forming a structure; and defining at least one of a side surface, a top surface, and a bottom surface of the module by the structure, wherein the structure comprises:

two steel plates arranged respectively on one side and the other side opposing each other in parallel;

a plurality of joint plates extending in parallel with and separately from each other between the two steel plates to connect the two steel plates to each other, a plane along which the plurality of joint plates extend being perpendicular to a plane along with the two steel plates extend;

a column disposed between adjacent joint plates of the plurality of joint plates and between the two steel plates; and two beams extending between the two steel plates from the column in opposing directions along which the two steel plates extend, the opposing directions being perpendicular to a longitudinal direction of the column, each of the plurality of joint plates being configured to support the two beams, wherein the structure includes a first structure and a second structure adjacent to each other in a longitudinal direction of the column, the step of forming the structure including:

engaging a first column of the first structure with a second column of the second structure to form the column; and connecting first steel plates on the one side and the other side of the first structure respectively to second steel plates on the one side and the other side of the second structure to form the two steel plates.

the method further comprising filling concrete into a space defined between the two steel plates.

5. Conclusion

Unless the context indicates otherwise, throughout the description and the claims, the words “comprise,” “comprising,” “include,” “including” and the like are to generally be construed in an inclusive sense, as opposed to an exclusive or exhaustive sense; that is to say, in the sense of “including, but not limited to.” The word “connected”, as generally used herein, refers to two or more elements that may be either directly connected, or connected by way of one or more intermediate elements. Where the context permits, words in the above detailed description using the singular or plural number may also include the plural or singular number respectively. The word “or” in reference to a list of two or more items, that word covers all of the following interpretations of the word: any of the items in the list, all of the items in the list, and any combination of the items in the list.

Conditional language used herein, such as, among others, “can,” “could,” “might,” “may,” “e.g.,” “for example,” “such as” and the like, unless specifically stated otherwise, or otherwise understood within the context as used, is generally intended to convey that certain embodiments include, while other embodiments do not include, certain features, elements and/or states.

While certain embodiments have been described, these embodiments have been presented by way of example only, and are not intended to limit the scope of the disclosure. Indeed, the novel structures, modules, structure bodies, and methods described herein may be embodied in a variety of other forms. Furthermore, various omissions, substitutions and changes in the form of the structures, modules, structure bodies, and methods described herein may be made without departing from the spirit of the disclosure. Any suitable combination of the elements and steps of the various embodiments described above can be combined to provide further embodiments. The accompanying claims and their equivalents are intended to cover such forms or modifications as would fall within the scope and spirit of the disclosure.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments. Embodiments of the technology disclosed herein may be applied to systems other than those expressly described herein.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase “and/or” as in “A and/or B” refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The invention claimed is:

1. A panel structure, comprising:

a first plate;

a second plate spaced apart from and positioned parallel to the first plate;

a support assembly positioned between the first plate and the second plate, wherein the support assembly includes— a column extending along a longitudinal axis; and a beam extending from the column parallel to the first plate and the second plate and perpendicular to the longitudinal axis; and a plurality of joint plates extending between the first plate and the second plate and connecting the first plate to the second plate, wherein the joint plates comprise a plurality of lower joint plates arranged in a first row and a plurality of upper joint plates arranged in a second row spaced apart from and extend parallel to one another, and wherein at least one of the joint plates is coupled to the beam to support the beam such that individual ones of lower portions of the upper joint plates include a first cutout shaped to receive an upper portion of the beam therein and individual ones of upper portions of the lower joint plates include a second cutout shaped to receive a lower portion of the beam therein.

2. The panel structure of claim 1 wherein the beam is a first beam extending from the column in a first direction, wherein the support assembly further comprises a second beam extending from the column in a second direction parallel to the first plate and the second plate, wherein the second direction is opposite to the first direction, wherein the first direction and the second direction are perpendicular to the longitudinal axis, wherein a first set of the joint plates is coupled to the first beam to support the first beam, and wherein a second set of the joint plates is coupled to the second beam to support the second beam.

3. The panel structure of claim 1 wherein the beam comprises an I-section beam or an H-section beam.

4. The panel structure of claim 3 wherein the at least one of the joint plates is connected to the I-section beam or the H-section beam by double angles.

5. The panel structure of claim 1 wherein the lower portion of individual ones of the upper joint plates is fixedly attached to the upper portion of the beam, and wherein the upper portion of individual ones of the lower joint plates is fixedly attached to the lower portion of the beam.

6. The panel structure of claim 5 wherein the upper portion of the beam comprises an upper flange, and wherein the lower portion of the beam comprises a lower flange.

7. The panel structure of claim 1 wherein the column includes an upper end portion, and wherein the support assembly further includes at least one functional member coupled to the upper end portion and having an upper portion obliquely angled relative to the longitudinal axis of the column.

8. The panel structure of claim 1, further comprising a fill material between the first plate and the second plate and surrounding the support assembly and the joint plates.

9. A panel structure, comprising:

a first plate;

a second plate spaced apart from and positioned parallel to the first plate;

a plurality of upper joint plates extending between the first plate and the second plate, wherein the upper joint plates are spaced apart from and extend parallel to one another;

a plurality of lower joint plates extending between the first plate and the second plate, wherein the upper joint plates are spaced apart from and extend parallel to one another;

a column positioned between the first plate and the second plate; and a beam extending from the column between the upper joint plates and the lower joint plates parallel to the first plate and the second plate, wherein a lower portion of individual ones of the upper joint plates includes a first cutout shaped to receive and be fixedly attached to an upper portion of the beam, and wherein an upper portion of individual ones of the lower joint plates includes a first cutout shaped to receive and be fixedly attached to a lower portion of the beam.

10. The panel structure of claim 9 wherein the beam is a first beam extending from the column in a first direction parallel to the first plate and the second plate, and further comprising a second beam extending from the column between the upper joint plates and the lower joint plates in a second direction parallel to the first plate and the second plate, wherein the second direction is opposite to the first direction.

11. A method of manufacturing a structure, the method comprising:

providing— a lower structure assembly including— a first lower plate;

a second lower plate spaced apart from and parallel to the first upper plate; and a plurality of lower joint plates extending between the first lower plate and the second lower plate and connecting the first lower plate to the second lower plate;

at least one beam between the first lower plate and the second lower plate, wherein the at least one beam is positioned on and supported by the lower joint plates; and an upper structure assembly including— a first upper plate;

a second upper plate spaced apart from and extending parallel to the first upper plate; and a plurality of upper joint plates extending between the first upper plate and the second upper plate and connecting the first upper plate to the second upper plate;

coupling the upper structure assembly to the lower structure assembly such that the upper joint plates are positioned on and supported by the at least one beam, wherein individual ones of the upper joint plates include a cutout, and wherein coupling the upper structure assembly to the lower structure assembly includes positioning the at least one beam within the cutouts;

connecting the first upper plate to the first lower plate; and
connecting the second upper plate to the second lower plate.

12. The method of claim 11 wherein the method further comprises disposing a fill material between the first lower plate and the second lower plate and between the first upper plate and the second upper plate such that the fill material surrounds the at least one beam, the lower joint plates, and the upper joint plates.

13. The method of claim 12 wherein the method further comprises coupling the upper structure assembly to the lower structure assembly, connecting the first upper plate to the first lower plate, and connecting the second upper plate to the second lower plate at a first location, and wherein disposing the fill material includes disposing the fill material at a second location remote from the first location.

14. The method of claim 11 wherein the method further comprises providing a column between the first lower plate and the second lower plate, and wherein coupling the upper structure assembly to the lower structure assembly includes positioning the column between an adjacent pair of the upper joint plates.

15. The method of claim 11 wherein the first lower plate, the second lower plate, the first upper plate, and the second upper plate comprise steel.

* * * * *